United States Patent [19]

Jaquette et al.

[11] Patent Number: 5,293,565
[45] Date of Patent: Mar. 8, 1994

[54] FORTMAT FOR DATA-STORING DISK MEDIA WHEREIN ADDRESSABLE TRACK ANGULAR LENGTH IS INDEPENDENT OF DISK REVOLUTIONS

[75] Inventors: Glen A. Jaquette; John E. Kulakowski; Judson A. McDowell; Rodney J. Means, all of Tucson, Ariz.

[73] Assignee: International Business Machines Corporation, Armonk, N.Y.

[21] Appl. No.: 831,026

[22] Filed: Feb. 4, 1992

[51] Int. Cl.$^5$ .............................................. G11B 5/09
[52] U.S. Cl. ...................................... 369/32; 360/48
[58] Field of Search ............................. 369/32; 360/48

[56] References Cited

U.S. PATENT DOCUMENTS

| | | | |
|---|---|---|---|
| 4,015,285 | 3/1977 | Romeas | 358/4 |
| 4,016,603 | 4/1977 | Ottesen | 360/135 |
| 4,422,110 | 12/1983 | Reynolds | 360/69 |
| 4,432,025 | 2/1984 | Grogan | 360/48 |
| 4,750,059 | 6/1988 | Syracuse | 360/48 |
| 4,814,903 | 3/1989 | Kulakowski et al. | 360/48 |
| 4,839,877 | 6/1989 | Kulakowski et al. | 360/48 |
| 4,873,679 | 10/1969 | Murai et al. | 369/32 |

OTHER PUBLICATIONS

IBM Technical Disclosure Bulletin, vol. 29, No. 4, Sep. 1986 titled "Skewed Format Method for Personal Computer Hard Disks to Reduce Rotational Latency Delays" pp. 1867–1868.

Primary Examiner—Tony M. Argenbright
Attorney, Agent, or Firm—H. F. Somermeyer

[57] ABSTRACT

Data-storing disks, preferably each disk having a single spiral track, have addressable tracks that are independent of the length of disk or spiral track revolutions. Each revolution may contain a non-integral number of addressable tracks and sectors. An optical disk is used to describe the invention. The circumferential location of the tracks and sectors precess circumferentially. A plurality of radially disposed revolution bands each contain a fixed number of the revolutions an increasing number of the addressable tracks in the radially outer more ones of the bands. It is preferred that the number of bands be $2^n$, where n is an integer. Each band is divided into a plurality of revolution groups, each group having a fixed number of revolutions. Each group in a band has a like number of the addressable tracks. A so-called anchor sector has one end anchored to a reference circumferential position on the disk. Each revolution group begins with an anchor sector, all other sectors in the group are positioned circumferentially with respect to the anchor sector. Addressable track seeking, alternate embodiments and fabrication of a disk are described.

85 Claims, 8 Drawing Sheets

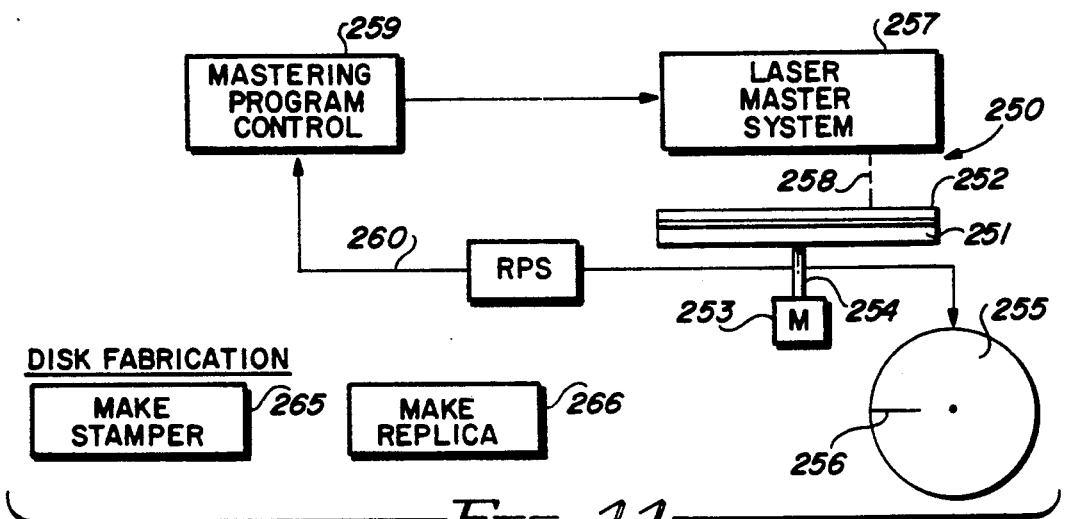
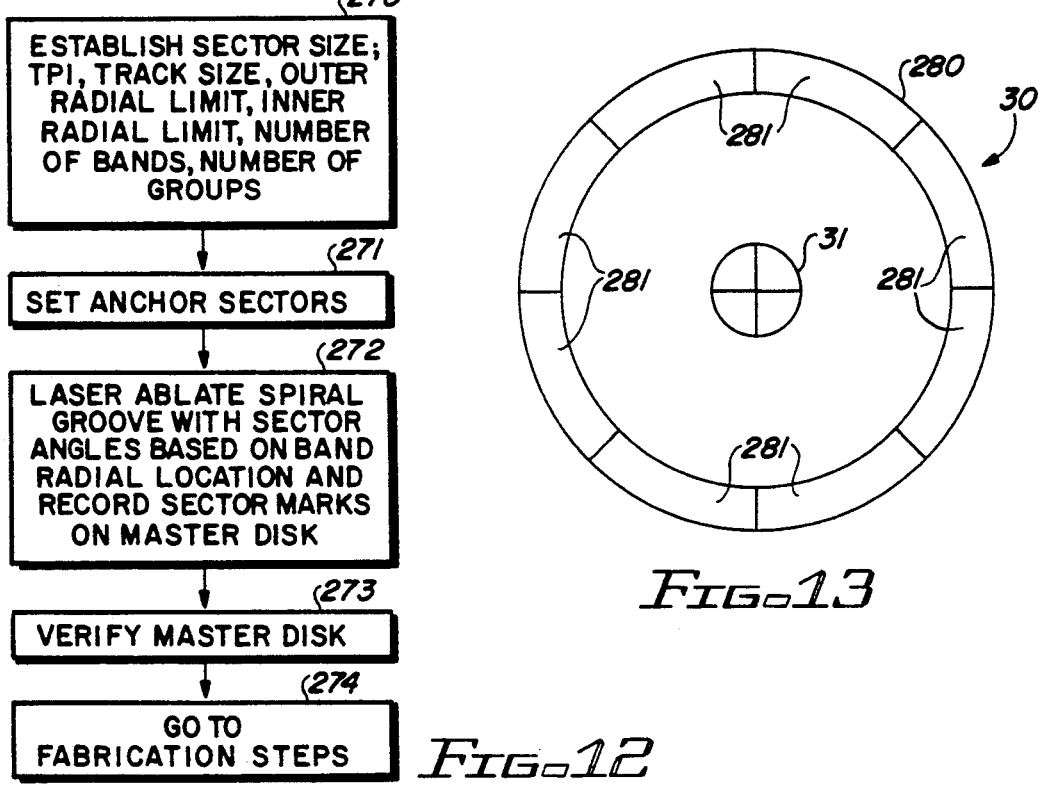
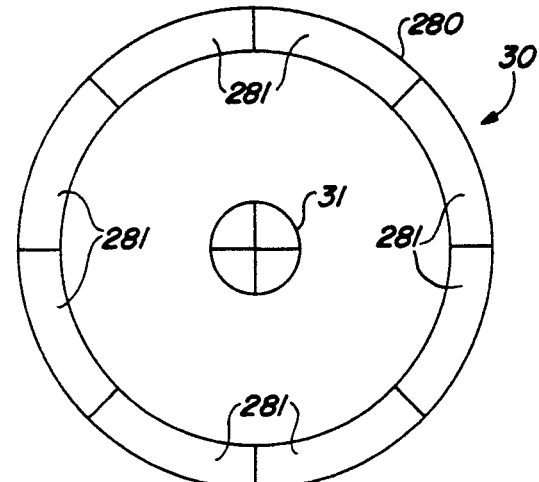
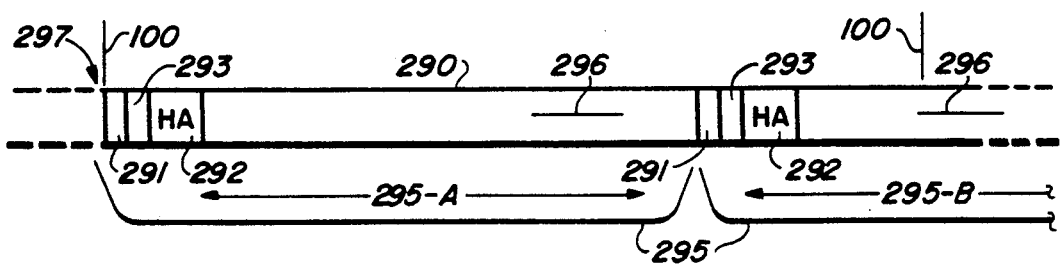

FORTMAT FOR DATA-STORING DISK MEDIA WHEREIN ADDRESSABLE TRACK ANGULAR LENGTH IS INDEPENDENT OF DISK REVOLUTIONS

DOCUMENTS INCORPORATED BY REFERENCE

Kulakowski et al U.S. Pat. No. 4,814,903 is incorporated by reference for its disclosure of locating and using spare sectors in a data-storing disk.

Kulakowski et al U.S. Pat. No. 4,839,877 is incorporated by reference for its disclosure of using a spindle index for rotationally addressing removable data-storing disks.

FIELD OF THE INVENTION

The present invention relates to data storage media and devices, particularly to a flexible format for data-storing disks that increases disk storage capacity while enabling a relatively simple addressing structure to be used in accessing addressable data storing ares of the disk.

BACKGROUND OF THE INVENTION

Data-storing circular-disk media, such as optical or magnetic disks, have used either concentric or spiral tracks. Typically, so-called magnetic hard disks and flexible diskettes have used concentric tracks while optical disks have used a single spiral track on each disk. It has been a long felt need to provide disk media that has a maximal data-storage capacity and simple addressing. Several attempts at banding media into a plurality of different track lengths having different lineal and angular data densities have complicated the addressing so that it is cumbersome to manage.

Prior art disk media have track lengths keyed or based upon one disk revolution angular length, i.e. either one or more tracks are completely occupy one disk revolution (also termed tracks in the literature). Often disk revolutions are colloquially equated to tracks. Applicants have discovered that this constraint unduly limits the disk storage capacities and restricts flexibility in designing disk formats. In particular, formats for so-called banded disks for increased capacities have been limited to one track, an integral number of sectors, as well as tracks, per spiral track revolution. That is, track lengths are always tied to the length of a disk revolution. This discussion relates to addressable physical tracks on disk media. Such physical tracks should not be confused with so-called logical or virtual tracks which merely map data onto physical tracks of a disk medium.

Because addressable tracks in the prior art were coextensive with each spiral track revolution or one revolution of a concentric set of revolutions, the term track has been used to colloquially denote a revolution. As used herein, the term "addressable track" means an identifiable addressable entity that is separate and distinct from a revolution of a spiral track or one revolution of a disk having concentric revolutions. The term "revolution", as used herein, defines one circuit of a spiral track equal to 360° of the spiral track. As applied to concentric revolutions, the term revolution means the entirety or 360° of each such physical revolution. The term "addressable entity" is intended mean any addressable track, any one of a plurality of addressable sectors or records in each such addressable track. As will become apparent, the size and capacity of an addressable track is totally independent of the extent of a revolution.

It is a desire of disk manufacturers to comply with the American National Standards Institute (ANSI) and International Standards Organization (ISO) standards on interchange media, i.e. removable media. Such standards apply not only to magnetic tape, but also to removable data-storing disks. In particular, optical disks are the subject of pending, proposed and issued standards of ANSI and ISO. In making advances in the recording arts, it is also desirable for cost and marketing reasons to provide compatibility with existing standards and industry practices. This compatibility is often referred to as "backward compatibility".

Current interchange standards for optical disks, inter alia, provide for either 512 byte or 1024 byte data-storing sectors in a single spiral track of each disk medium. Each optical disk revolution, also termed a track in the prior art, contains either seventeen of the 1024 byte sectors or thirty-one of the 512 byte sectors. Combining the desires for greater disk capacity while maintaining linear addressing with backward compatibility creates substantial problems in the conflicting requirements.

The present invention solves both problems while providing a greater flexibility in designing, building and using data-storing disk media, drives and systems. A single base format enables using either the 512 or 1024 byte sectors without change in the base format; only the physical size of the sectors are changed. Other sector capacities may also be used in the single base format. The addressing methodology is unchanged, that is, the number of sectors in an addressable track is not changed. For 512 byte sectors there always are 31 sectors per addressable track and for 1024 byte sectors there are always 17 sectors per track.

It is also desired to directly access a data-storing area without extensive computation or scanning a disk being accessed. In banded disks, such direct accessing can be complicated and burdensome. Accordingly, addressing of tracks and sectors should be straight forward and consistent over the address space of the data-storing sectors and tracks. The sectors and tracks are addressable entities on a disk. Usually a single spiral track is not separately addressed, no limitation to that exclusion from addressing is intended. In accordance with the present invention, the addressable entities on a disk have data-storing capacities and angular extents that are independent of a data-storing capacity of one of the revolutions and of the angular extent of one revolution. That is, neither sectors nor addressable tracks need be and preferably are not selected to be an integral submultiple of a spiral track revolution nor an integral multiple of a spiral track revolution. In some embodiments there may be an integral number of sectors per revolution but not an integral number of addressable tracks per revolution nor does a single addressable track need to have an integral number of revolutions.

DISCUSSION OF THE PRIOR ART

The Otteson patent number U.S. Pat. No. 4,016,603 shows a banded or zoned disk using Count Key and Data (CKD) formatted tracks. The track lengths and capacities in the various zones or bands are different. While disk capacity is greatly increased, addressing and data management are complicated by the different track lengths. Otteson teaches that the radially outermost zone should have the greatest number of tracks, i.e the greatest number of disk revolutions, as well as tracks having the greatest disk storing capacity. Otteson also teaches that a disk supporting spindle has an index or tachometer disk for use in rotationally or angularly addressing data-storing areas on the data-storing disks. A sector servo is employed by Otteson for enabling a transducer to faithfully and accurately scan any track on the data-storing disks. All track lengths are keyed to and based upon the circumferential length of disk track revolutions. Concentric tracks are shown.

The IBM Technical Disclosure Bulletin, Vol. 29, No. 4, September 1986 on pages 1867-8 discloses a magnetic hard disk having sectors that are angularly offset at different radii. The purpose of the offsetting is to reduce latency time. The offsetting allows for the elapsed time necessary for seeking from one concentric track to an adjacent concentric track.

Syracuse in U.S. Pat. No. 4,750,059 shows a banded magnetic hard disk having concentric tracks in zones that increase in radial extent with increasing radius. The largest zone is the radially outwardmost zone, similar to the Otteson teaching.

Reynolds in U.S. Pat. No. 4,422,110 teaches using two radially spaced-apart transducers for use in banded media. Each of the transducers are in a different radial band.

Romeas in U.S. Pat. No. 4,015,285 shows a video disk having track lengths equal to disk revolution lengths. The tracks are circumferentially offset by one sector of track.

Kulakowski et al in U.S. Pat. No. 4,814,903, that is incorporated by reference into this application, shows locating spare sectors at the end of a track. One track is one revolution of a single spiral track on the disk. The spare sectors are placed in a usual or desired area where stop-motion jumping is to occur. Since the spare sectors may not contain data, such jumping usually does not detract from data transfer rates.

Murai et al in U.S. Pat. No. 4,873,679 show a disk having constant linear recording density. Successively radially outward tracks have an increasing number of sectors. There are always an integral number of sectors in each revolution of one spiral track.

Kulakowski et al in U.S. Pat. No. 4,839,877, also incorporated by reference into this application, show using a disk support spindle index or tachometer disk for assisting in rotationally or angularly addressing data-storing areas on a removable data-storing disk.

Grogan in U.S. Pat. No. 4,432,025 shows a banded disk with different length tracks. Each track is contained in and its length in bytes is determined by the disk revolution in which it is positioned.

SUMMARY OF THE INVENTION

It is an object of the present invention to enable maximizing data storage capacity of data-storing disks while maintaining a relatively linear addressability of addressable data-storing areas on the data-storing disks.

In accordance with the invention, addressable data-storing tracks have lengths independent of the individual length of revolutions of the disk. Each addressable track has a plurality of fixed-size (preferably like-sized) addressable data-storing sectors. Each revolution of the disk need not have an integral number of the data-storing sectors. Anchor sectors are provided that precisely anchor all sectors between two radial spaced-apart anchor sectors by being precisely located with respect to a single radially-extending circumferential or angular reference position. Such reference position is determined by a spindle index mark in manufacturing equipment used to format the disk. The anchoring by the spindle index mark removes and limits cumulative angular position errors individually addressable sectors or tracks.

Each disk has one or more revolution groups, each group beginning at one of the anchor sectors. The sector locations intermediate the anchor sectors in any one revolution group is based upon circumferential displacement from said anchor sectors. As such, the relative location of the intermediate sectors depends only on the anchor sector location. Such relative location is independent of any one revolution of the disk.

A band of a plurality of revolution groups has one angular density for recorded control indicia and data. Each successively radially outward band has increasing angular density of recording and a greater number of addressable tracks. It is preferred that each group and each band on any one medium have identical radial extents. Such preference provides a lineal progression of number of addressable tracks in each band and in the increase in angular recording density. It is further preferred that the number of bands be a number $2^n$, where n is a positive integer. This selection facilitates generating a separate frequency of operation for each band in devices or drives that record or read data to and from the disk medium.

In an alternate embodiment of the invention, within each band, all sectors are circumferentially aligned.

In yet another embodiment of the invention, a spiral track defined on one media surface by a spiral groove or a spiral set of sector servo indicia is imposed on co-axial co-rotating data-storing disks. The format of revolution groups and bands is imposed on all of the co-axial co-rotating data-storing disks.

The format of this invention is useable on any type of disk media, preferably that has a single spiral track either formed or recorded thereon or imposed thereon from a co-axial co-rotating disk.

Another aspect of this invention pertains to the manufacture of embossed disk replicas having the format of this invention. Such manufacturing includes generating a master disk having the format written thereon by ablative or additive recording processes. A spindle index on the mastering machine establishes the anchor sectors to be at said reference radially-extending position and relatively locates all intermediate sectors relative to the anchor sectors.

In yet another aspect of this invention, enhanced seeking to a target addressable track is achieved by counting spiral-track revolution crossings. The number of revolution crossings is determined algorithmically.

The foregoing and other objects, features, and advantages of the invention will be apparent from the following more particular description of preferred embodiments of the invention, as illustrated in the accompanying drawings.

DESCRIPTION OF THE DRAWINGS

FIGS. 11 and 12 illustrate manufacturing one of disks in the FIG. 2 illustrated disk apparatus.

FIG. 13 illustrates a band of revolutions having an integral number of sectors per revolution and a non-integral number of addressable data-storing tracks per revolution.

FIG. 14 diagrammatically illustrates applying the invention as a count-key-data (CKD) formatted disk.

DETAILED DESCRIPTION

Figure 1:
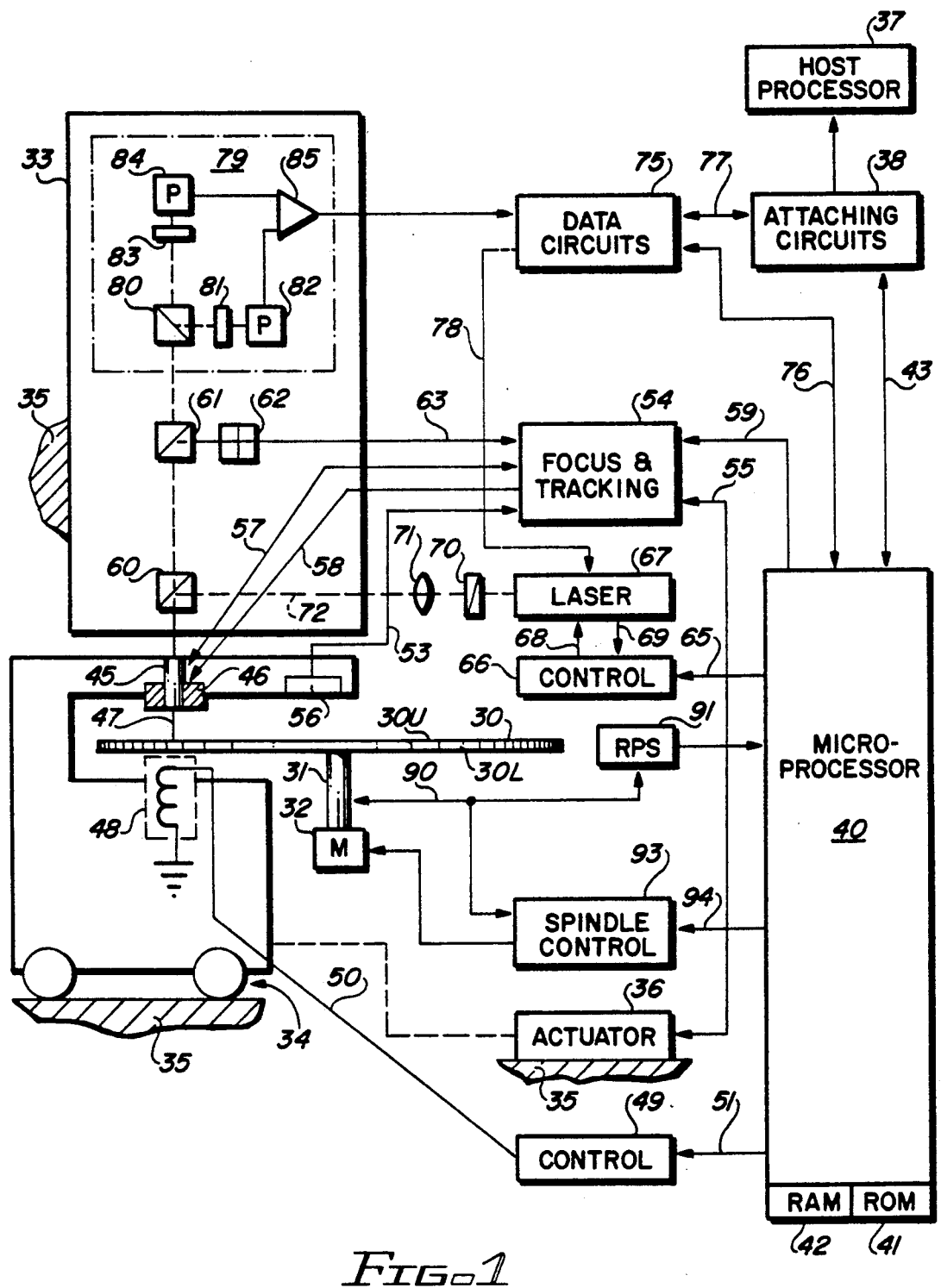
FIG. 1 is a block diagram of an optical disk recorder/player device with which the present invention is advantageously employed.

Referring now more particularly to the appended drawing, like numerals indicate like parts and structural features in the various figures. Before going into the details of how the procedures and criteria are effected in accordance with the present invention, an environment in which the present invention is advantageously practiced is shown in FIG. 1. A device similar to the FIG. 1 illustrated magneto optical drive may be used in generating a master disk for creating stamped replicas using a format of the present invention. Such mastering is described in the description of FIGS. 11 and 12. In FIG. 1, magneto-optic record disk 30 is mounted for rotation on spindle 31 by motor 32. Optical signal processing portion 33 is mounted on frame 35. A headarm carriage 34 moves radially of disk 30 for carrying an objective lens 45 from disk revolution to disk revolution for accessing any one of a large plurality of addressable tracks. A frame 35 of recorder suitably mounts carriage 34 for reciprocating radial motions. The radial motions of carriage 34 enable access to any one of a plurality of concentric revolutions or circumvolutions of a spiral track for recording and recovering data on and from the disk. Linear actuator 36, suitably mounted on frame 35, radially moves carriage 34 for enabling addressable track accessing. The recorder is attached to one or more host processors 37, such host processors may be control units, personal computers, large system computers, communication systems, image signal processors, and the like. Attaching circuits 38 provide the logical and electrical connections between the optical recorder and the attaching host processors 37.

Microprocessor 40 controls the recorder including the attachment to the host processor 37. Control data, status data, commands and the like are exchanged between attaching circuits 38 and microprocessor 40 via bidirectional bus 43. Included in microprocessor 40 is a program or microcode-storing, read-only memory (ROM) 41 and a data and control signal storing random-access memory (RAM) 42.

The optics of the MO recorder include an objective or focusing lens 45 mounted for focusing and radial tracking motions on headarm 33 by fine actuator 46. This actuator includes mechanisms for moving lens 45 toward and away from disk 30 for focusing and for radial movements parallel to carriage 34 motions; for example, for changing tracks within a range of 100 tracks so that carriage 34 need not be actuated each time a track adjacent to a track currently being accessed is to be accessed. Numeral 47 denotes a two-way light path between lens 45 and disk 30.

In magnetooptic recording, magnetic bias field generating coil 48 generates a magnetic steering or bias field for erasing and recording disk 30. Electromagnet coil 48 provides a weak magnetic steering or bias field for directing the remnant magnetization direction of a small spot on disk 30 illuminated by laser light from lens 45. A laser light spot heats the illuminated spot on the record disk to a temperature above the Curie point of the magnetooptic layer (not shown, but can be an alloy of rare earth and transitional metals as taught by Chaudhari et al., U.S. Pat. No. 3,949,387). This heating enables the magnet coil 48 generated bias field to direct the remnant magnetization to a desired direction of magnetization as the spot cools below the Curie point temperature. For writing data on disk 30, magnet coil 48 supplies a bias field oriented in the "write" direction, i.e., binary ones recorded on disk 30 normally are "north pole remnant magnetization". To erase disk 30, magnet coil 48 supplies a magnetic bias field such that the field's south pole is adjacent disk 30. Magnet coil 48 control 49 is electrically coupled to magnet coil 48 over line 50 to control the write and erase directions of the coil 48 generated magnetic field. Microprocessor 40 supplies control signals over line 51 to control 49 for effecting reversal of the bias field magnetic polarity.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55 to actuator 36. Additionally, the fine actuator 46 control by circuits 54 is exercised through control signals travelling to fine actuator 46 over lines 57 and 58, respectively for effecting respective focus and track following and seeking actions. Sensor 56 senses the relative position of fine actuator 46 to headarm carriage 34 to create a relative position error (RPE) signal. The RPE signal travels over line 53 to focus and tracking circuits 54 for servo control during seeking and track following. Line 57 consists of two signal conductors, one conductor for carrying a focus error signal to circuits 54 and a second conductor for carrying a focus control signal from circuits 54 to the focus mechanisms in fine actuator 46.

Line 58 also represents plural electrical conductors respectively for carrying control and sensed signals between circuits 54 and fine actuator 46.

The focus and tracking position sensing is achieved by analyzing laser light reflected from disk 30 over path 47, thence through lens 45, through one-half mirror 60 and to be reflected by half-mirror 61 to a so-called "quad detector" 62. Quad detector 62 has four photoelements which respectively supply signals on four lines collectively denominated by numeral 63 to focus and tracking circuits 54. Aligning one axis of the detector 62 with a track center line, track following operations are enabled. Focusing operations are achieved by comparing the light intensities detected by the four photoelements in the quad detector 62. Focus and tracking circuits 54 analyze the signals on lines 63 to control both focus and tracking.

Recording or writing data onto disk 30 is next described. It is assumed that coil 48 bias field is oriented for recording data. Microprocessor 40 supplies a control signal over line 65 to laser control 66 for indicating that a recording operation is to ensue. This control signal means that laser 67 is energized by control 66 to emit a high-intensity laser light beam for recording; in contrast, for reading, the laser 67 emitted laser light beam is a reduced intensity for not heating the laser illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser, such as a gallium-arsenide diode laser, can be modulated by data signals so the emitted light beam represents the data to be recorded by intensity modulation. In this regard, data circuits 75 (later described) supply data indicating signals over line 78 to laser 67 for effecting such modulation. This modulated light beam passes through polarizer 70 (linearly polarizing the beam), thence through collimating lens 71 toward half mirror 60 for being reflected toward disk 30 through lens 45. Data circuits 75 are prepared for recording by the microprocessor 40 supplying suitable control signals over line 76. Microprocessor 40 in preparing circuits 75 is responding to commands for recording received from a host processor 37 via attaching circuits 38. Once data circuits 75 are prepared, data is transferred directly between host processor 37 and data circuits 75 through attaching circuits 38. Data circuits 75, also ancillary circuits (not shown), relating to disk 30 format signals, error detection and correction and the like. Circuits 75, during a read or recovery action, strip the ancillary signals from the readback signals before supply corrected data signals over bus 77 to host processor 37 via attaching to 38.

Reading or recovering data from disk 30 for transmission to a host processor requires optical and electrical processing of the laser light beam from the disk 30. That portion of the reflected light (which has its linear polarization from polarizer 70 rotated by disk 30 recording using the Kerr effect) travels along the two-way light path 47, through lens 45 and half-mirrors 60 and 61 to the data detection portion 79 of the headarm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remnant magnetization on disk 30 spot being accessed has a "north" or binary one indication. This passed light impinges on photocell 82 for supplying a suitable indicating signal to differential amplifier 85. When the reflected light was rotated by a "south" or erased pole direction remnant magnetization, then polarizer 81 passes no or very little light resulting in no active signal being supplied by photocell 82. The opposite operation occurs by polarizer 83 which passes only "south" rotated laser light beam to photocell 84. Photocell 84 supplies its signal indicating its received laser light to the second input of differential amplifier 85. The amplifier 85 supplies the resulting difference signal (data representing) to data circuits 75 for detection. The detected signals include not only data that is recorded but also all of the so-called ancillary signals as well. The term "data" as used herein is intended to include any and all information-bearing signals, preferably of the digital or discrete value type.

The rotational position and rotational speed of spindle 31 is sensed by a suitable tachometer, index or emitter sensor 90. Sensor 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. Microprocessor 40 employs such rotational signals for controlling access to data storing segments on disk 30 as is widely practiced in the magnetic data storing disks. An example of such rotationally controlled accessing of data-storing tracks is shown in U.S. Pat. No. 4,839,877, supra.

Additionally, the sensor 90 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

While the preferred usage of the preferred embodiment is in an optical disk, such as magneto optical disk 30, the present invention is applicable to any data-storing disk. Such disks include read-only optical disks, magnetic hard disks, magnetic or optical floppy diskettes, as well as other types of data-storing disks. Also included in appropriate media for practicing the present invention are any write-once disks, as well as other forms of read-only, write-once or rewriteable (also termed erasable) data-storing disks having diverse types of signal-storing layers for retentively or temporarily storing data or other information-bearing signals. While an emphasis of the invention is for media interchange, the invention is equally useful for disks fixed in a disk drive or device. Any size of disk, track pitch, linear density and radial extent of a recording area of a disk may be used. While it is preferred that a continuous spiral track on each medium be used, other arrangements may also be used.

Figure 2:
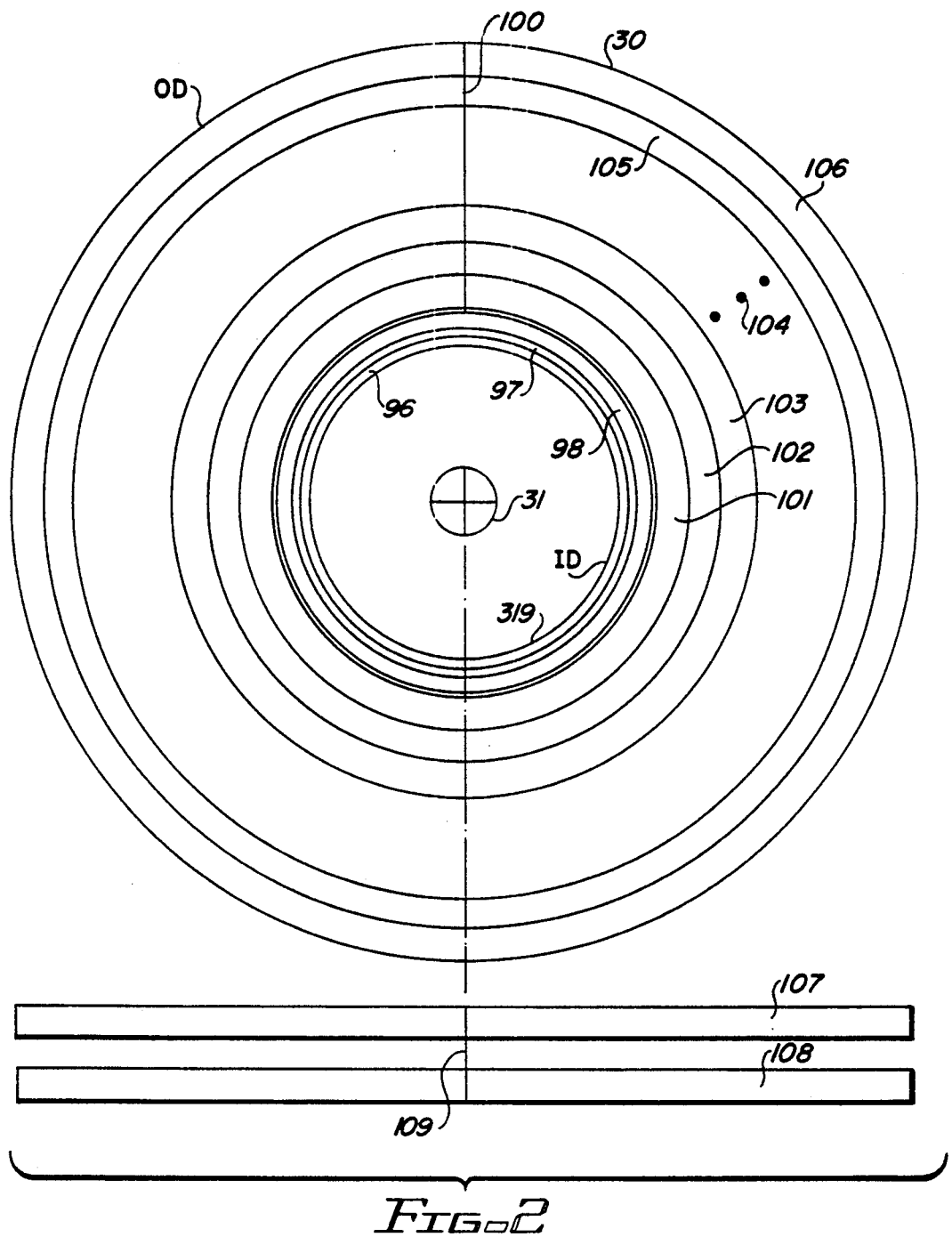
FIG. 2 is a diagrammatic showing of optical disk apparatus constructed in accordance with the present invention and which may be used by the FIG. 1 illustrated device.

FIG. 2 includes a simplified diagrammatic plan view of a disk 30 formatted in accordance with the present invention. Beginning at of inner diameter ID 319 and extending radially toward outer diameter OD of disk 30, a so called control area having phase-encoded part PEP 96, standard format part SFP 97 and manufacturer area MFG 98 enables a FIG. 1 illustrated device to determine the operating parameters of disk 30. The details of this control area are explained later with respect to FIG. 16. Not shown in FIG. 2 is a replication of the MFG 98 and SFP 97 areas at the outer diameter OD of disk 30. In such OD replication, MFG 98 is radially inward of SFP 97. A so-called lead out spiral track revolution may be disposed radially outward of the SFP 97 OD replica. MFG 98 is an extension of band 0 101 in that the same frequency of operation is used for MFG 98 as used in band 0. Likewise, the OD MFG 98 replica is a radial outward extension of band 106 in that the frequency of operation in both the MFG 98 replica and band 106 is the same.

Radial line 100 represents a fiducial or reference circumferential position of disk 30. Such position corresponds to a usual index line embossed or recorded on prior art disks. Disk 30 does not have such an index line because, as will become apparent, many later-described data-storing sectors span reference position 30 while so-called "anchor" sectors each have one end aligned with reference position 30.

Disk 30 has a single spiral track extending between an outer radial extremity and an inner radial extremity in a usual manner. The present description assumes that scanning the spiral track proceeds radially outwardly, no limitation thereto intended. The single spiral track is divided into radial bands 101–106, each band having a like number of revolutions of the single spiral track. Ellipsis 104 signifies that a plurality of such bands of spiral track revolutions exist between bands 103 and 105. In magneto optical disk 30, such spiral track is represented by a usual continuous spiral groove (not shown) in the surface of the disk. The actual spiral track may be either in the groove or on a land area contiguous with the spiral groove. Each band has a number of addressable equal-data-storing capacity addressable tracks which is greater than the number of spiral track revolutions in each band. The number of addressable tracks in each band increases with radius of the band. In early embodiments, each successively radially outward band had a fixed plurality of additional addressable tracks than its adjacent radially inward band of either seventeen 1024 byte data-storing sectors or thirty-one 512 byte data-storing sectors. The fixed number of additional tracks is based upon the number of later-described revolution groups in each of the bands. The described embodiment shows 99 of the revolution groups in each band. Each of the revolution groups in the radially outer band had one additional addressable track than each revolution group in a next radially inner band. Hence, each radially outer band had an additional 99 addressable tracks.

To maximize capacity of a disk 30 for practicing the present invention, the ratio of the outer diameter OD of the recording area and the ID 319 of the recording area equal 1 +n, where n is the number of bands 101–106. The above statement is true for practicing the present invention for a disk having a given minimum angular density of a radially inwardmost band, where each band includes a plurality of spiral track revolutions and where the addressable tracks are not based upon nor keyed to one disk revolution of 360°.

Also diagrammatically shown in FIG. 2 is applying the invention to a stack of co-rotating co-axial disks 30, 107 and 108 that rotate about axis 109 that is co-axial to spindle 31. In this extension, a usual "comb" head may be used to access the surfaces of the three disks 30, 107 and 108. A spiral track on disk 30, the spiral track being identified by a spiral groove or a spiral set of sector servo marks has identifications of addressable tracks embossed or otherwise recorded on disk 30. In this sense, disk 30 has a servo positioning surface, in addition to storing data, for guiding transducers (not shown) that respectively access recording surfaces on disks 107 and 108 in the same manner that current day magnetic "hard" disks use a single servo surface for positioning a set of transducers on respective recording surfaces. The reference position 100 is imposed on all of the disks 107, 108 by timing control in the same manner that a radial index line recorded on a servo surface of present day magnetic hard disks. This one servo surface and associated servo control (part of focus and tracking circuits 54) for simultaneously positioning 17 transducers on 17 recording surfaces. The recording surfaces of disks 107 and 108 are preferably smooth such that the recording thereon respectively indicates the tracks. Of course, the positioning is controlled by the servo position circuits 75 of FIG. 1 using the spiral groove of disk 30 in a usual manner. It is to be understood that the reference position 100 on each of the recording surfaces of disks 30, 107, 108 can be precisely aligned for synchronizing operation of all of the recording surfaces. Such precise alignment is not required if the surfaces are accessed independently of each other. Further, the timing and positioning of the later described anchor sectors, anchor tracks and precessing ones of the sectors and tracks is timed by the servo operation of the servo surface. That is, only one of the disks 30, 107 and 108 need have a servo positioning recording.

In another disk apparatus arrangement, a single disk 30 has recording on both surfaces. The illustrated upper recording surface 30U (FIG. 1) that has a recording coating (not shown) and a spiral track indicating groove. The arrangement of the spiral groove and its indicated single spiral track provides for scanning from ID 319 to OD of disk 30. There are two arrangements that may be used for achieving two-sided recording. A first arrangement is to make the lower surface 30L smooth and having an MO coating. Instead of a single lens 45 that focusses a beam on surface 30U, an additional optical system (not shown) focuses a second laser beam on surface 30L. Both optical systems are supported as a so-called comb head wherein both beams are moved simultaneously with the carriage 34 while each will have a separate fine actuator, the illustrated fine actuator 46 is controlled by following the spiral groove whereas a second fine actuator (not shown) has a servo control slaved to fine actuator 46 motions for positioning the second laser beam on surface 30L identically to the actuator 46 motions. In this arrangement the spiral tracks on surfaces 30U and 30L are axially superposed.

In a second arrangement, both surfaces 30U and 30L have a spiral groove, the spiral groove on surface 30U is arranged to provide for scanning from ID 319 to OD of disk 30 while the spiral groove on surface 30L has a reversed direction of scanning from OD to ID 319. The reverse direction of scanning is required for maintaining one direction of rotation of disk 30 for scanning both surfaces 30U and 30L. A separate and independent optical, bias field generating and positioning systems as described for supplying and modulating a laser beam on path 47 (FIG. 1) is replicated for scanning, recording, reading and erasing operations on surface 30L.

Figure 3:
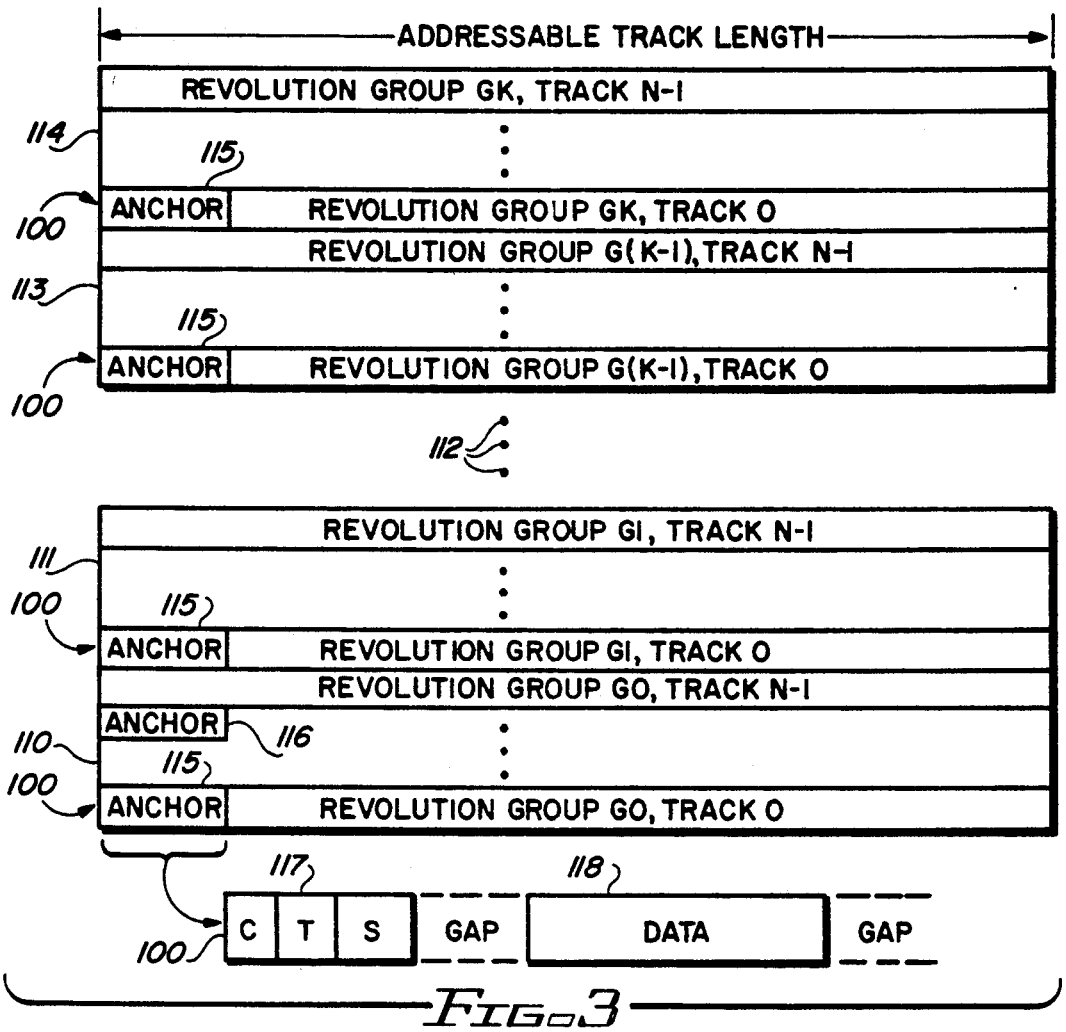
FIG. 3 diagrammatically illustrates the revolution band format of plural revolution groups of the FIG. 2 illustrated disk apparatus including format of a data-storing sector.

FIG. 3 illustrates the addressable-track arrangement in each of the revolution bands 101–106. Note that there is no reference to revolutions because the track arrangement is independent of revolutions. The arrangement is such that an integral number of sectors and addressable tracks exist in each of said revolution bands. Each revolution group has an established absolute angular or circumferential position for preventing accumulation of angular errors in sector locations from extending beyond each revolution group. The size of each revolution group is preferably selected based upon accuracy of a so-called mastering machine as described with respect to FIGS. 11 and 12. All addressable tracks have the same length and data storage capacity as measured in number of data-storing sectors (either 17 or 31) and data storage capacity (either 17,408 or 15,872 data bytes plus sector marks 117). Therefore, from an programmed addressing systems and accessing point of view, all addressable tracks have the same length and are backward compatible with many prior art addressing and disk formats. The circumferential length of these constant-length addressable tracks vary with radius as is known. The two mentioned addressable track sizes correspond to the prior ANSI and ISO prescribed track capacities and extents. Such prior tracks are respectively co-extensive with revolutions of a single spiral track.

Returning now to FIG. 3, a plurality of revolution groups 110–114 are shown. Ellipsis 112 represents a plurality of such revolution groups disposed between revolution groups 111 and 113. All of the revolution groups 110–114 constitute one revolution band. All revolution bands 101–106 have an identical number of revolution groups (no limitation thereto intended) and every revolution group has an identical number (14) of spiral track revolutions (no limitation thereto intended). This selection of identities in size of the revolution groups and bands facilitates constructing devices to operate with each disk, as will become apparent. Every revolution group in each respective revolution band has an identical number of addressable tracks. The number of addressable tracks in radially successively outer bands increases by a constant number (no limitation thereto intended). In an early embodiment, each revolution group in succeeding radially outer band have one additional addressable track. If each band has fifty revolution groups, then each succeeding radially outer band has an additional fifty addressable tracks. As set forth in Table 1 below, each band has 99 revolution groups resulting in an additional 99 tracks per radially outer band.

Table 1 below shows the addressable track numbers (addresses) and the spiral track revolution numbers in sixteen bands numbered 0–15. The table was computed using the equation $TB_n = N + (B_n * K)$ wherein TB is the number of addressable tracks in a band, n indicates the number of the band (0–15), K is the number of tracks added to each successive radial outer band, as set forth above and $B_n$ is the band number. In this early embodiment of the invention for a 130 mm disk having a single spiral track, each of sixteen ($2^4$) revolution bands had addressable tracks each having seventeen 1024 byte data-storing sectors. The table shows the lineal progression of increasing numbers of addressable tracks per bands having an increasing inner radius, respectively. Each radially outward band has 99 additional tracks. This number will be better understood later.

TABLE 1

| Band Numbers | Band Radii | Addressable Track Numbers | Disk Revolution Numbers |
|---|---|---|---|
| 0 | 30.00 mm–31.87 mm | 0 to 1,583 | 0 to 1,385 |
| 1 | 31.87 mm–33.74 mm | 1,584 to 3,266 | 1,386 to 2,771 |

TABLE 1-continued

| Band Numbers | Band Radii | Addressable Track Numbers | Disk Revolution Numbers |
|---|---|---|---|
| 2 | 33.74 mm–35.61 mm | 3,267 to 5,048 | 2,772 to 4,157 |
| 3 | 35.62 mm–37.48 mm | 5,049 to 6,929 | 4,158 to 5,543 |
| 4 | 37.48 mm–39.36 mm | 6,930 to 8,909 | 5,544 to 6,929 |
| 5 | 39.36 mm–41.23 mm | 8,910 to 10,988 | 6,930 to 8,325 |
| 6 | 41.23 mm–43.10 mm | 10,989 to 13,166 | 8,316 to 9,701 |
| 7 | 43.10 mm–44.97 mm | 13,167 to 15,443 | 9,702 to 11,087 |
| 8 | 44.97 mm–46.84 mm | 15,444 to 17,819 | 11,088 to 12,473 |
| 9 | 46.84 mm–48.71 mm | 17,820 to 20,294 | 12,474 to 13,859 |
| 10 | 48.72 mm–50.58 mm | 20,295 to 22,868 | 13,860 to 15,24 |
| 11 | 50.58 mm–52.45 mm | 22,869 to 25,541 | 15,246 to 16,631 |
| 12 | 52.45 mm–54.32 mm | 25,542 to 28,313 | 16,632 to 18,017 |
| 13 | 54.32 mm–56.20 mm | 28,314 to 31,184 | 28,018 to 19,403 |
| 14 | 56.20 mm–58.07 mm | 31,185 to 34,154 | 29,404 to 20,789 |
| 15 | 58.07 mm–59.94 mm | 34,155 to 37,223 | 20,790 to 22,175 |

Figure 9:
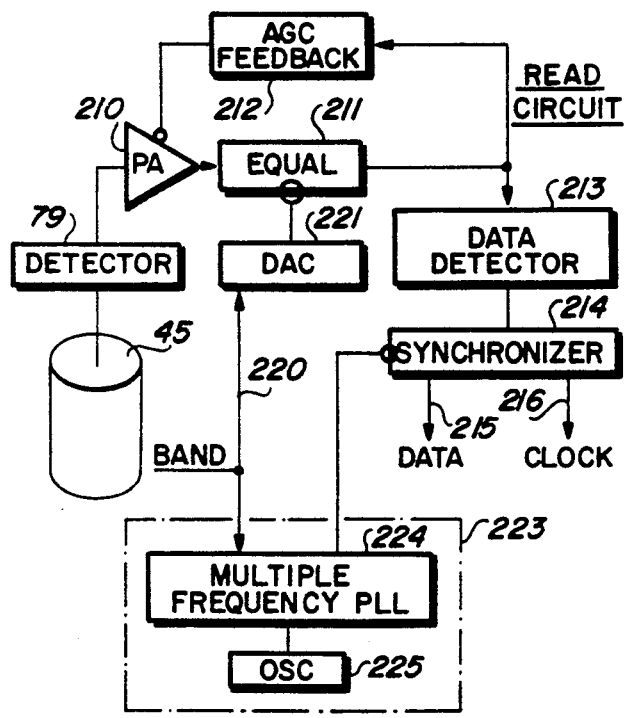
FIGS. 9 and 10 respectively show read and write circuits usable with the FIG. 1 illustrated apparatus for practicing the present invention in its best mode.
Figure 10:
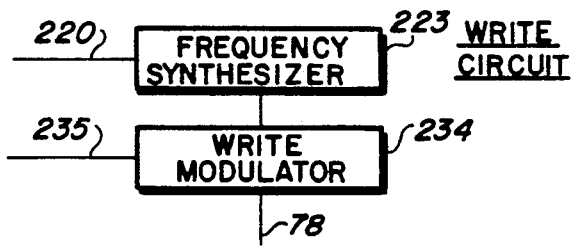

One of the advantages of the invention is to provide linear step sizes in frequency changes from one revolution band to a next radially-outward revolution band. The frequencies of operation for data recording and reading in the early embodiment of the invention are listed below. A later described binary digital control changes frequency division ratios of a source clock to obtain the frequencies in each of the bands listed below. FIGS. 9 and 10 illustrate an digital control implementation enabled by the below listed frequencies. The frequency changes are linear with respect to the inner radial locations of each of the bands 0–15 (there are $2^4$ bands); therefore, the linear frequency changes can be achieved by a digital to analog converter (DAC).

TABLE 2

| Nominal Clock Frequencies | |
|---|---|
| Band Number | Clock Frequency Mhz |
| PEP (radially in) | 9.864 |
| PEP Transition | 9.864 |
| SFP Control Track | 9.864 |
| Manufacturer Area | 11.274 |
| Band Number | |
| 0 | 11.274 |
| 1 | 11.978 |
| 2 | 12.682 |
| 3 | 13.387 |
| 4 | 14.092 |
| 5 | 14.797 |
| 6 | 15.501 |
| 7 | 16.206 |
| 8 | 16.910 |
| 9 | 17.615 |
| 10 | 18.320 |
| 11 | 19.024 |
| 12 | 19.729 |
| 13 | 20.434 |
| 14 | 21.138 |
| 15 | 21.843 |
| Manufacturer Area | 21.843 |
| SFP Control Track | 9.864 |
| Lead Out Track | 9.864 |
| outer disk diameter | |

Table 2 shows that the manufacturer area MFG 98 requires the same frequency of operation as band 0 while the outer diameter MFG 98 replica requires the same frequency of operation as band 15. The SFP 97 and PEP 96 require frequencies of operation not related to the band structure of the present invention.

Returning to FIG. 3, each revolution group 110–114 has an anchor sector 115. Each anchor sector has one end aligned with the reference position as represented by line 100, FIG. 2. Such reference position is essential to prevent accumulation of angular position errors during fabrication of a master disk, as described later with respect to FIGS. 11 and 12. That is, the precise absolute determined positioning of anchor sectors 115 eliminates accumulated errors of sector angular positions to one revolution group. In said early embodiment, each revolution group has in integral number of addressable tracks.

Such integral number of addressable tracks in each revolution group is not a limitation of this invention. Each revolution group may include one or more intermediate anchor sectors, such as anchor sector 116. Anchor sector 116 can be located at a midpoint of an addressable track which is a middle addressable track in the revolution group; two such intermediate anchor sectors can be located respectively at one-third points of a revolution group, etc. If intermediate anchor sectors are employed, then precession of the frequencies of operation, the number of addressable tracks per band is changed and may not be maximized. Further, construction of devices to operate with such formatted disks may be more complex.

Every sector on disk 30 has an identical internal format. The internal format of anchor sector 115 of revolution group 110 is shown. A so-called sector field 117 identifies each sector. The first portion C of field 177 is a clock synchronizing field having embossed signals of known arrangement. The frequency of operation enabled by each portion C varies with bands as shown in Table 2. Second scanned portion T contains an embossed indication of the addressable track number or address. Third scanned portion S contains an embossed indication of the sector number within the addressable track (either 0-17 or 0-31, for example). Not shown for brevity are error detection redundancies. The second field 118 of each sector is the data storing field. On writable disks, field 118 is not embossed. On read only disks or portions of disks, field 118 contains data represented by embossed indicia. An intrarecord gap (unnumbered) separates fields 117 and 118. An inter-record gap (unnumbered) is adjacent field 118 for separate the illustrated field 118 from the sector field of a next adjacent sector (not shown) sector field (not shown).

As will become more apparent, all addressable tracks have a track length independent of the revolution length. In each revolution group, a first number of addressable tracks fit into a second number of spiral track revolutions. The illustrated embodiment shows the constant length addressable tracks always occupying less than one revolution. In this embodiment, all revolution groups have 14 revolutions. The number of addressable tracks in any revolution group in any band can be calculated from Table 1 by dividing the number of addressable tracks in each band by 99. On smaller radius disks, one addressable track may occupy more than one spiral track revolution, at least in radially inward ones of the bands. By coincidence, one of the bands on a disk may have an integral number of tracks per revolution, i.e. 1, 2 etc. addressable tracks per revolution. Other bands, as contemplated by the early embodiment, have a nonintegral number of addressable tracks per spiral track revolution.

In the illustrated embodiment, each spiral track revolution has a non-integral number of sectors. This arrangement means that the sector angular or circumferential locations within each revolution group precess around the disk. FIG. 13, later described, shows an alternate embodiment having an integral number of sectors per spiral track revolution for enabling using radially aligned sector fields 117 within each band. The number of sectors in each such spiral track revolution may be fewer, the same or more sectors than constitute one of the addressable tracks. In a banded disk medium, each band has a different number of addressable tracks and portions thereof in each spiral track revolution. Making the addressable track a constant length in terms of number of sectors and storage capacity (bytes) and independent of the spiral track revolution lengths enables maximizing data storage capacity of the disk while maintaining track addressability used in the prior art—backward compatibility.

Figure 4:
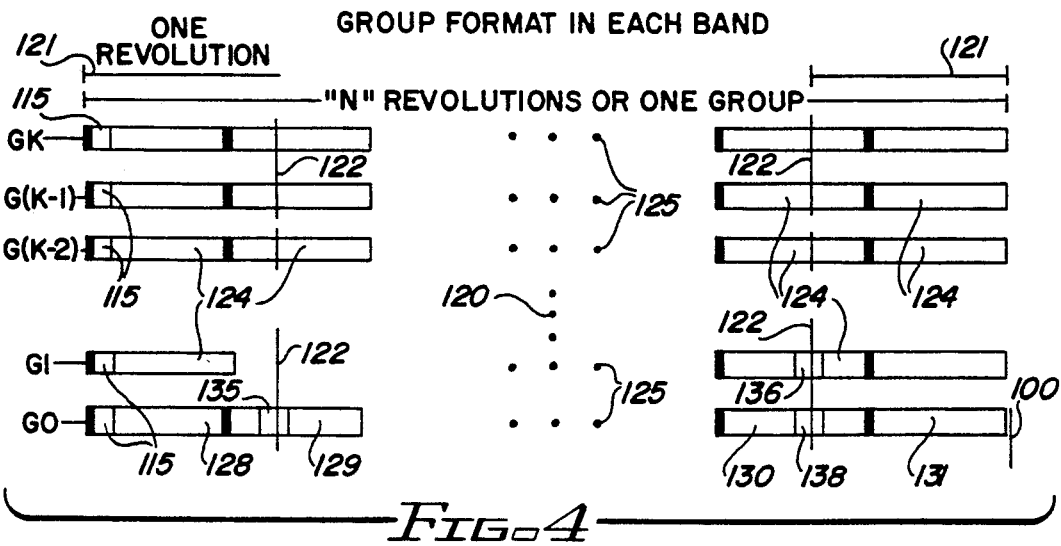
FIG. 4 diagrammatically illustrates format of a revolution group in any revolution band of the FIG. 2 illustrated disk apparatus.

FIG. 4 illustrates, in greater detail, the relationship of the sectors in each revolution group with respect to the spiral track revolutions. Again, one revolution band is shown. Revolution groups G0 through GK (K is an integer having no relationship to the constant K used in later described equation (1).) are shown. Each revolution group contains a large number of sectors as indicated by ellipsis 125. The illustrated revolution band has a large number of revolution groups as indicated by ellipsis 120. N spiral track revolutions 121 (N is an integer that has no relation to the symbol N used in equation (1).) constitute one revolution group. An integral number of addressable tracks 124 are in each revolution group. The track and sector precession is illustrated in group G0, it being understood that groups G1-GK are identical. An anchor sector 115 defines the beginning of each revolution group and is circumferentially aligned with reference position 100. Numeral 122 denotes reference position 100 within each of the revolution groups. Addressable track 128 of G0 begins at reference position 100 as an anchor sector 115. The second addressable track in G0 is addressable track 129. Addressable track 129 begins at the ending of first addressable track 128. Line 122 shows that reference position 100 (end of a spiral track revolution) dissects second addressable track 129. The angular position of second addressable track 129 depends from the angular position of first addressable track 128. Each succeeding addressable track in G0 is similarly angularly or circumferentially located. As such, circumferential positioning errors may accumulate as explained in the description of the mastering process Similarly, at the end of revolution group G0, last addressable track 131 ends approximately at reference line 100. The penultimate addressable track 130 of G0 is dissected by, i.e. spans, the reference position 100 as indicated by line 122.

As mentioned above, except the anchor sectors 115 and 116, the angular position of the sectors also precess circumferentially. Because of this circumferential precession, some of the sectors span, i.e. are dissected by, reference position 100. Sectors 135 shown in addressable tracks 129 and 130 span reference position 100, hence are dissected by line 122 and reference position 100.

Figure 5:
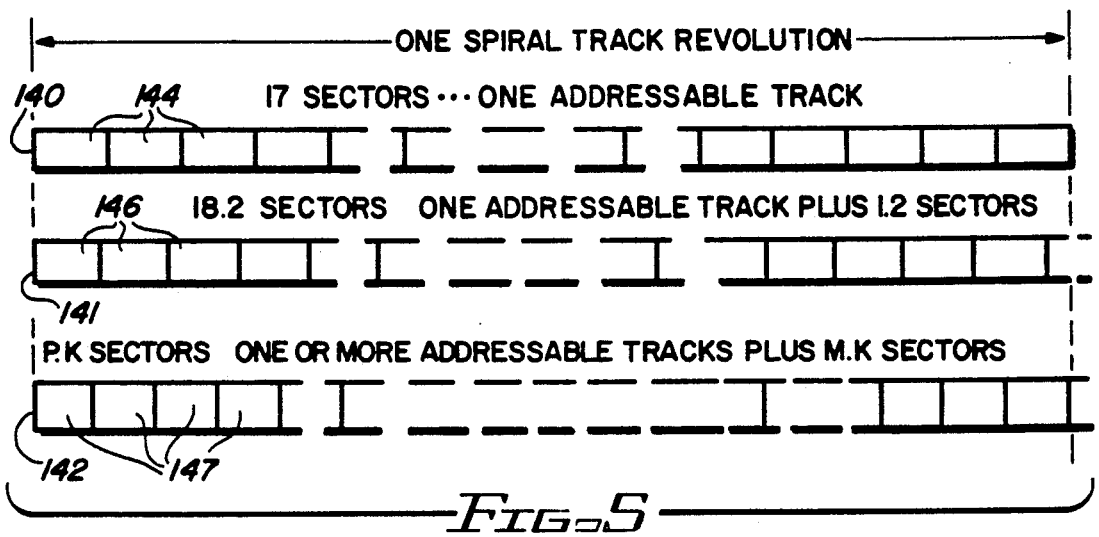
FIG. 5 diagrammatically illustrates revolution format of three revolutions having an integral and non-integral number of data-storing sectors shown in FIG. 3.

FIG. 5 illustrates a variation on tracks and sectors per spiral track revolution. Portions of three spiral track revolutions 140-142 are diagrammatically shown. Revolution 140 has 17 sectors 144 and contains one addressable track. Second revolution 141, in a band that is radially outward from spiral track revolution 140 has 18.2 sectors or one addressable track of 17 sectors plus 1.2 sectors from a second addressable track. Third spiral track revolution has P.K sectors (P is an integer and K is a fraction. This K is not related to any other K in this application.) for storing J addressable tracks. J may be any number from 0 (stores only a partial track) to several addressable tracks plus a portion of another addressable track. Spiral track revolution 142 is generalized to show flexibility of practicing the present invention.

Figure 6:
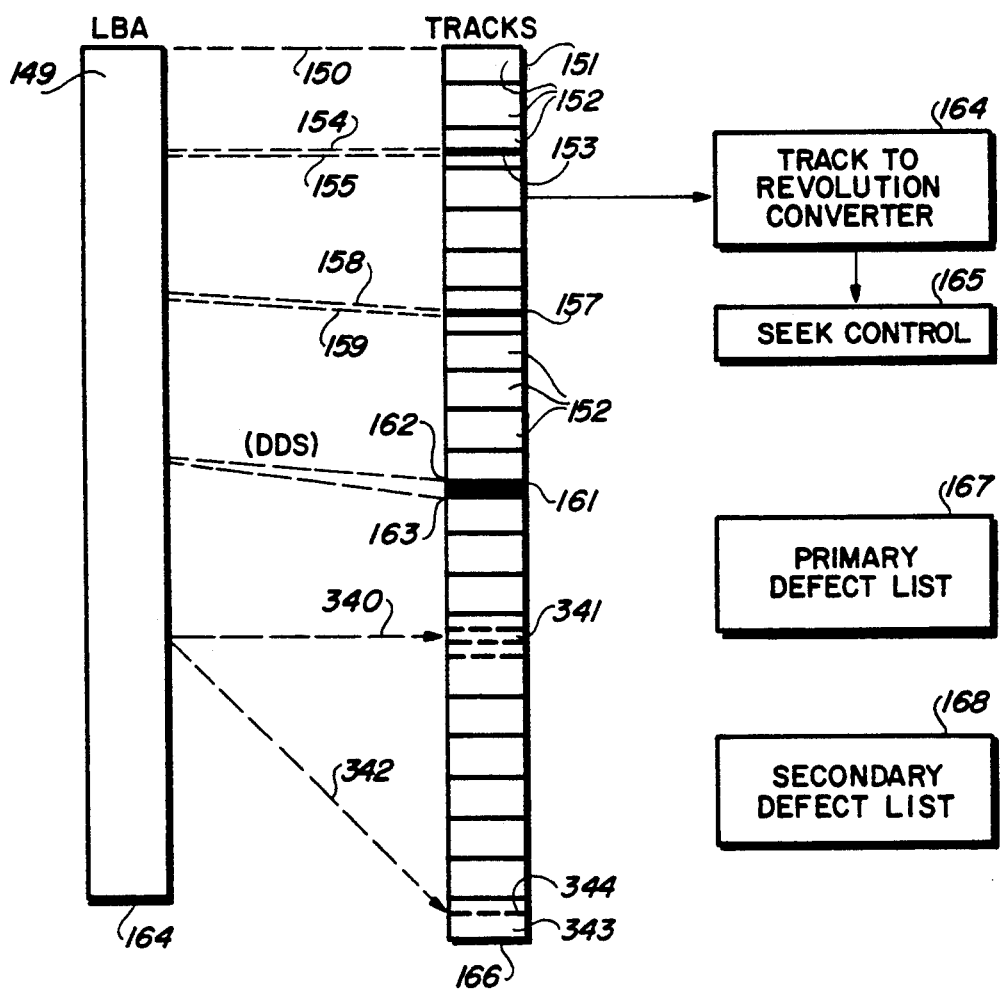
FIG. 6 diagrammatically illustrates an addressing mechanism usable with the FIG. 2 illustrated data-storing disk.

FIG. 6 shows a logical to real address translation scheme that enables full advantage of practicing the present invention. This addressing scheme is based upon the logical addressing found for many present day optical disks. The attaching host processor 37 addresses data on disk 30 using a logical block address (LBA) 149. LBA 149 determines which of the addressable entities, such as sectors, are spare sectors and their respective locations on disk 30.

LBA 149 is managed by either one of two algorithms. A first one has been used for optical disks. In this algorithm, the number of entries in LBA 149 is constant for each disk and is based upon the number of addressable entities in the disk designated for storing data. Spare entities are not included in LBA 149. Later described secondary pointers enable addressing spare sectors via LBA 149. A second algorithm for addressing using LBA 149 is used in magnetic flexible diskettes. In this second algorithm, the address range of LBA 149 varies with the number of demarked or unusable sectors and the number of spare sectors. LBA 149 identifies for addressing only the tracks and sectors that are designated for storing data. In the event one of the sectors identifiable by the illustrated address translation becomes unusable, then a later described pointer points to a spare sector that replaces the sector gone bad. Such substitution is well known.

All of the addressable tracks on disk 30 are identified in the column 166 labelled "tracks". Dashed line 150 represents that the first LBA address points to a first sector (not shown) in first track 151. Succeeding LBA addresses point to higher numbered sectors in track 151. The translation continues through track boundaries into tracks 152, each lower indicated track in FIG. 6 representing a track having a higher or larger address value. Plural defective sectors 153 cannot be addressed by LBA addresses. Dashed line 154 shows a given LBA address pointing to a last good sector adjacent a first one of the unusable sectors 153. Similarly, dashed line 155 represents an LBA address value one greater than the LBA address value represented by dashed line 154 pointing to a first good sector immediately adjacent the bad sectors 153 and having a sector number one greater than the highest bad sector number. Therefore, the LBA addressing is continuous. As a result of many bad sectors, the actual addressable track address space is constant. In some applications (first algorithm), such as found in optical disks, the LBA extent remains constant. When so-called floppy magnetic disks are used (second algorithm), the LBA extent decreases as the number of bad sectors increase with time.

Other bad sector areas 157 and 161 similarly cause a skipping of the bad sectors for maintaining a continuous LBA address space. Dashed lines 158 and 162 respectively indicate an adjacent good sector immediately adjacent a lowest bad sector number in defects 157 and 161. Numerals 159 and 163 respectively indicate a first good sector adjacent a highest numbered bad sector in defects 157 and 161.

All spare sectors can be located at the radially outermost track of the disk 30, such as spare sectors 343 in the last portion indicated by dashed line 344 in the radially outermost addressable track. If a sector 341 goes bad during data processing operations, then LBA 149 is updated such that the original pointer 340 to sector 341 is modified. This modification includes adding secondary pointer 342 that points to one of the spare sectors 343. In this manner the pointed to spare sector stores the data originally intended for sector 341.

Figure 8:
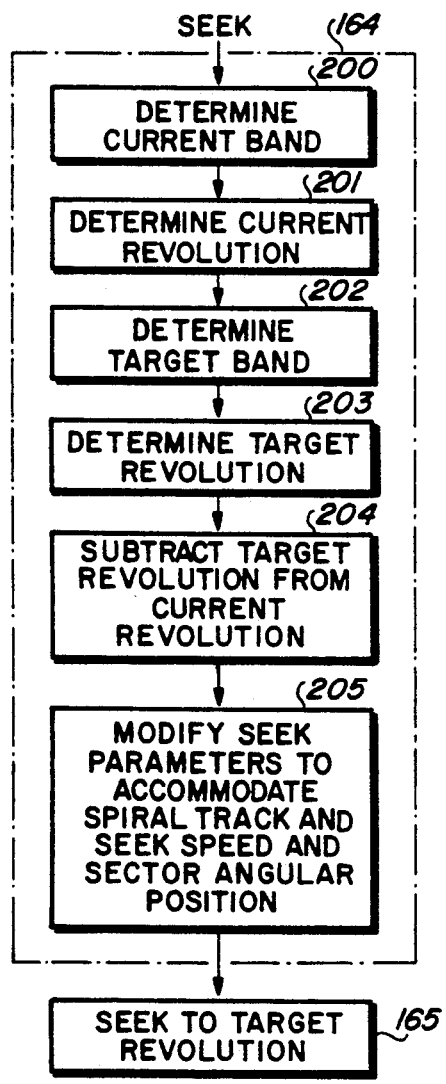
FIG. 8 is a machine operations flow chart showing seeking from a current track to a target track by counting disk revolutions.

Once an LBA address is identified with sectors in the addressable tracks, track to revolution convertor 164 identifies the spiral track revolution having the addressed sectors and addressable tracks (see FIG. 8). The revolution number is supplied to seek control 165 that generates a seek operation based upon the number of spiral track revolutions needed to be crossed from a currently addressed track being scanned to a target track identified by an LBA address range received from host processor 37. Details of the generated seek operation are described later.

A part of the addressing structure includes redirection apparatus for redirecting access requests from a bad or defective sector to an alternate sector. Primary and secondary defect lists 167 and 168, respectively, are lists relating to bad sectors. In one algorithm for handling identifying defective sectors, at the time of disk initialization detected defective sectors are listed in a primary defect list 167. List 167 may include pointers to spare sectors assigned to record or store data intended for the defective sectors. As shown in FIG. 6 such defective sectors can be removed entirely from the address space. Secondary defect list 168 is like the primary defect list but is generated during data-to-day usage of the disk. That is, defects can be detected after shipment of the disk from a factory and placed in the secondary defect list. While separate addressable areas on disk 30 have been used for lists 167 and 168, the two lists can be combined or can remain separate and still be stored in the same addressable area (such as a sector) on disk 30. Different types of media, i.e. ROM, MO etc, can be handled differently. In a so-called slip mode of formatting, bad sectors are taken out of the LBA 149 address space. IN a so-called replace mode of formatting, an alternate sector pointer replaces the pointer to the defective sector or can be in a table wherein the alternate sector pointer is associated with the original defective sector pointer.

Figure 7:
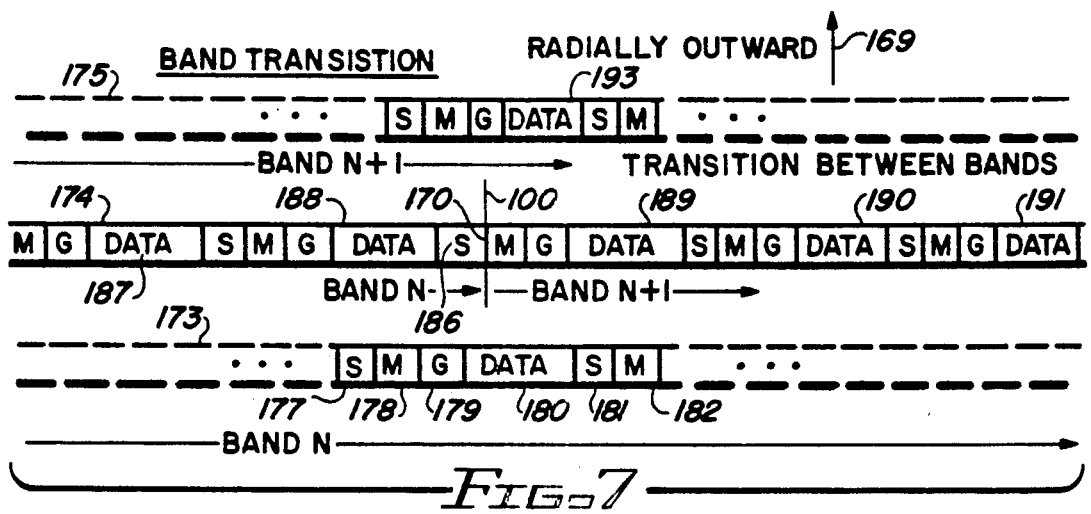
FIG. 7 diagrammatically illustrates format of sectors abutting a boundary between two radially adjacent ones of the revolution bands shown in FIGS. 2-4.

An important aspect of the present invention is the control of scanning the single spiral track across a boundary between two radially adjacent revolution bands. FIG. 7 illustrates the problems and the solutions to such boundary 170 crossing. A radially outward direction is indicated by arrow 169. Reference position 100 is indicated by the vertical line 100 that also indicates the precise boundary 170 between a band "N" and a next radially outward band N+1. The band "N" corresponds to B used in later-described equation (1). The track scan is from left to right as viewed in FIG. 7. It is understood that the illustrated portions of spiral track revolutions 173 (having illustrated sectors 178–180), 174 (having illustrated sectors 187–191) and 175 (having illustrated sector 193) are a part of the Archimedes spiral track; the portions of the three spiral track revolutions are shown as being linear only for convenience in making the illustration. In a disk having 16 bands, radially inwardmost revolution 173 (band N) results in a frequency of operation that is about 6–7% lower than the frequency of operation in band N+1. For bands having identical radial extents, as the number of bands increase, the frequency change decreases. Likewise, as the number of bands decrease, the frequency change increases.

Each sector includes the aforedescribed sector portion or field following an inter sector gap S 177 and indicated as being sector mark M 178. M 178 is constructed as shown in FIG. 3 by sector field 117. M 178 contains the address of the current addressable track being scanned and the number of the sector currently being scanned. Intra-sector gap 179 separates the sector field 178 from data field or portion 180.

Sectors 187 and 188 are the last sectors to be scanned in band N before the band boundary 170 is crossed. Sectors 189, 190 and 191 are the first three sectors to be scanned after the band boundary 170 is crossed. Sector 188 of band N requires a device operation frequency that is about 6% (see Table 2 for illustrative band frequencies) lower than the device operation required for reading and recording in first sector 189 of band N−1. Such frequency shifting in operation is achieved while traversing inter-sector gap S 186. Gap 186 is also termed an inter-band gap. In an alternate embodiment, inter-band gap 186 may subtend a greater angle than the inter-sector gaps 181 that are not inter-band gaps. Such greater angle requires a greater scan time than required for gap 181. Therefore, after scanning last-sector 188 of band N a greater elapsed time occurs before M field of first sector 189 of band N+1 is reached. This increase in elapsed time between sectors 188 and 189 provides a longer time for the FIG. 9 and 10 illustrated circuits to change frequency. If disk 30 is used in so-called real-time operations, then extending the inter-band gap has to be accommodated in signal processing circuits beyond the present description.

For reading data recorded in sector 189 (first sector of band N+1), the readback circuits of each device are adjusted while traversing inter sector gap 186, then the circuits are frequency and phase synchronized in field M of sector 189. Traversing intra-sector gap G of sector 189 allows more settling of the readback circuits before the frequency and phase clock synchronization occur for reading data stored in the data field of sector 189. Recording into sector 189 requires a similar procedure as described later with respect to FIG. 10.

One alternate approach for inter-band frequency changing is to either denominate sectors 187 and 188 as being spare sectors such that both sectors are scanned over without data transfers. The principles set forth in the Kulakowski et al U.S. Pat. No. 4,814,903 apply in that the spare sectors are used for two different purposes. Yet another alternate approach is to denominate the last sector 188 in each band as not being usable. Then, while scanning an empty data field in last sector 188, more time is provided for shifting the frequency of operation of the device clocks (later described) before accessing first sector 189 of band N+1 at an increased device circuit frequency of operation. Circuits are available to quickly shift the frequency of device circuit operations, therefore, effecting inter-band frequency changing while traversing inter-band gap 186 (FIG. 7) is a best mode of this portion of the invention. In this latter regard, prior art readback and recording circuits in high performance magnetic tape drives were rapidly synchronized as the magnetic tape was moving at a speed resulting in a frequency deviation from a required frequency of operation of up to about 20%. Another alternate approach to handle the band boundary 170 crossing is to denominate first sector 189 as being unavailable (spare or not usable). If the fast frequency shifting is not to be employed for any reason it is preferred that the last few sectors, such as sectors 187 and 188 of a band be denominated as spare sectors. Of course, all spare sectors for each band can be contiguously located near boundary 170 (FIG. 7). In this instance the number of spare sectors can vary between bands. Since radially outer bands having a greater number of addressable tracks and sectors, such radially outer bands may have a greater number of spare sectors. The number of spare sectors in each band can be a constant percentage of the number of sectors in each respective band. The determination of a desired percentage for spare sectors is beyond the teachings of the present description.

FIG. 8 illustrates a seek sequence from a current addressable track to a target addressable track that counts revolution (spiral track groove) crossings to effect the seek. The description of the revolution-counting effected addressable track seek is based upon a spiral grooved medium or disk 30 as found in most present day optical disks. Other forms of spiral track revolution indications may be employed. Track to revolution converter (also see FIG. 6) consists of a microprocessor executed set of machine steps 200–205 as next described. In machine step 200 the address of the current track being scanned is converted into a spiral track revolution number. This conversion is effected by microprocessor 40 solving the equations below. First the band number in which the current addressable track is located (band number is 0-15) is determined:

$$B_n = \text{integer of } \{(1 - 2N + SR)/2K\} \quad (1)$$

wherein $B_n$ is the band in which the current addressable track is located. B indicates band and "n" is the number of band in which the current addressable track is located, i.e. numbered from 0-15 in a sixteen bands on the disk. N is the number of addressable tracks in band 0 (radially inwardmost band 101). K is a constant that indicates the integer increase in number of addressable tracks per band. That is, the increase in number of addressable tracks in a radially outer band as compared to its adjacent radially inner band, i.e. the change in number of tracks from band 1 to 102, for example. As shown in FIG. 7, the increase K is the number of additional addressable tracks found in band N+1 over the number of addressable tracks found in band N.

SR is a square root factor defined as:

$$SR \text{ is the square root of } (2N-1)^2 + (8 \cdot T \cdot K) \quad (2)$$

In (2), * signifies multiplication, T is the track number of the current addressable track as set forth in Table 1 above.

Next, microprocessor 40 determines the relative addressable track number "t" of track T in band $B_n$, that is, starting with an addressable track in band $B_n$ having the lowest addressable track number $T_n$:

$$t = T - T_n + 1 \quad (3)$$

$$\text{where } T_n = B_n\{N + K[(B_n - 1)/2]\} \quad (4)$$

In calculating the spiral track revolution number, microprocessor 40 computes a revolution factor RF and a band factor BF. Using RF and BF, microprocessor 40 calculates the angular location of the sector S in the revolution of the current addressable track and the revolution number in which the current addressable track resides. First the calculation of RF is shown as:

$$RF = R[(T*M) + S] \quad (5)$$

where R is the number of spiral track revolutions in band $B_n$ and M is the number of sectors in one addressable track.

Band factor BF is calculated as:

$$BF = M[N + (B_n * K)] \quad (6)$$

$$\text{Then } R_n = integer\{[RF/BF] + (B_N * R)\} \quad (7)$$

where $R_n$ is the revolution in which the current addressable track resides, the revolution is in band $B_n$ and R is the number of spiral track revolutions per band.

As next calculated in machine step 201, the spiral track revolution in which the current addressable track resides is:

$$R_t = integer\{(R*RF)/(M+BF) + (B_n*R) \quad (8)$$

$R_t$ is the spiral track revolution in which the addressable track resides. The other terms are defined above.

Machine steps 202 and 203 solve the equations set forth above for the target addressable track. These calculations identify the target band and target revolution on disk 30.

Machine step 204 finds the difference between the target revolution and the current revolution, i.e. the radial seek distance expressed in spiral track revolutions. A positive number indicates a radially outward seek while a negative number indicates a radially inward seek. Machine step 205 also modifies the number of revolutions in the radial seek distance to accommodate the circumferential positions of the current and target addressable tracks and the seek of the speed as it relates to subtracting or adding revolution counts. This accommodation is a known seek adjustment control for spiral tracks. The pitch of the spiral track versus the speed of the seek determines the accommodation value.

Machine step 205 also determines the accommodation of the circumferential positions of the current sector and target sector. Such determination includes solving the equations other factors, all as set forth below.

The circumferential location of the current and target sectors are first calculated. In the equations below, sector S denotes the current and target sectors in two successive calculations, one for the current and one for the target sector. The successive calculations respectively determine circumferential location of the current and target sectors as measured from reference line 100 as an angle expressed in degrees.

The circumferential position is expressed as angle A, expressed in degrees:

$$A = 360\{RF/BF\} - integer\{RF/BF\} \quad (9)$$

The determined angles are then used in the above-described accommodation in calculating a true seek distance.

Another factor in determining the true seek distance is an extended length inter-band gap 186. If the extension is small, then the extension is ignored. If the extension is long, that the circumferential angle is adjusted to accommodate the inter-band gap length being longer than other inter-sector gaps. The total extra circumferential displacement is determined by multiplying the extended length of inter-band gap (i.e. the added length) by the number of band boundaries 170 crossed in the seek yielding a gap product value. The angle of the radially outward sector, either the current or target sector, is increased by the gap product value.

Then, in machine step 165, the actual seek to the target addressable track using spiral track revolutions is effected.

FIG. 9 illustrates a read back circuit, a part of data circuits 75 (FIG. 1), usable with the present invention. In particular, the FIG. 9 illustrated circuit is adapted for efficiently traversing band boundaries 170 (FIG. 7). Table 2 lists the band frequencies required to be used by the FIG. 9 illustrated read back circuit. This change in frequency between bands is about 6%.

Referring now if FIG. 9, lens 45 (FIG. 1) transmits reflected laser light from disk 30 to detector 79 (also shown in FIG. 1). In reading, the disk 30 reflected light is modulated by the stored signals. The modulation is a block coded signal that carries information as to its timing, i.e. it is self timing or self-clocking. Variable gain power amplifier (PA) 210 amplifies the detector 79 supplied electrical signal. Equalizer (EQUAL) 211 processes the amplified signal in a usual manner. A feedback signal is fed back by EQUAL 211 through automatic gain control (AGC) feedback element 212 to PA 210 for automatically adjusting the VGA gain to optimize operation, as is known. The equalized signal also travels from EQUAL 211 to data detector 213 for detecting data from the self-timed or self-clocked readback signal, as is known. Data detector 213 supplies its detected signal to electronic synchronizer 214 for separating the data and clock signals that are respectively supplied over lines 215 and 216 to other usual data and clocking circuits, not shown. Frequency synthesizer 223 times the operation of synchronizer 214 in a known manner. Multiple frequency PLL (phase locked loop) 224 receives a reference frequency signal from oscillator OSC 225. PLL 224 supplies the usual timing signals to synchronizer 214 for timing its operation for separating data from the detected readback signal received from detector 213. The above described read back circuit is a usual read back circuit for optical disks.

In accordance with the invention, a revolution band indication signal is received from microprocessor 40 over line 220, said line 220 being a part of line 76 of FIG. 1. In this regard, microprocessor 40 has programming that effects the calculations set forth herein plus monitors device operation with respect to bands being scanned on disk 30. The band, revolution group, addressable track and sector number being scanned are logged and updated on a real time basis, as is usual practice in peripheral data storage devices of all types. In any event, the band indicating signal (binary 0-15 or 4 bits) drives digital-to-analog (DAC) convertor 221 for adjusting operation of EQUAL 211 to the frequencies shown in Table 2. The digital control signal on line 220 may be a coded control value derived by calculations in microprocessor 40 (not described) in a usual manner from the actual band number. In any event, the value on line 220 drives DAC 221 to produce an analog output signal that varies in accordance with the particular design points of EQUAL 211. If the actual band number is supplied, then circuitry (not shown) in EQUAL 211 and DAC 221 convert the band number signal to a control signal for adjusting EQUAL 211. Equalizer circuits (filter) 211 that are changeable for passing different frequency bands of signals are known and are not described for that reason.

Microprocessor 40, upon determining that the scan of a last sector 188 is completed switches the line 220 band number signal to the next band N+1 frequency of operation. Whenever the last sector 188 has been denominated as a spare sector (which spare is not storing data) or as an unusable sector, then completion of the data reading in last sector 188 is completed upon reading field M of sector 188. Then EQUAL 211 and DAC 221 have the elapsed time of scanning the last sector 188 data field plus gap 186 to adjust the frequency of operation to band N+1, Microprocessor 40 preferably anticipates circuit delays in operation of DAC 221 and EQUAL 211 by sending the band indicating signal over line 220 before the completion of reading last sector 188. Since read back circuits have frequency tolerances such anticipatory control change enhances the operation of the FIG. 9 illustrated circuit transitions from one band to another band. The shortest elapsed time for changing frequency at band transition 170 is scanning inter-sector or inter-band gap 186 (FIG. 7). DAC 221 continuously supplies its analog control signal to EQUAL 211 such that EQUAL 211 operates in a band of frequencies that PA 210 is supplying. Also during a seek operation, microprocessor 40, before the seek is completed, supplies a band signal on line 220 that is for the band in which the target sector/track resides.

Write or record and erase circuit shown in FIG. 10 effects transition from one band N to a next band N+1 over band transition 170 similarly to the FIG. 9 illustrated read circuit. Frequency synthesizer 223 of FIG. 9 also times the operation of the FIG. 10 illustrated write or recording circuit. Microprocessor 40 supplies the appropriate band signal over line 220 to frequency synthesizer 223 at all times. Therefore, frequency synthesizer 223 always generates signals having the correct frequency for a band being scanned. Frequency synthesizer 223 times the operation of write modulator 234 to generate a laser modulating signal on line 78 based upon the data-to-be-recorded received over line 235, such as receiving user data from attaching circuits 38, control and ECC data generated internally by data circuits 75 in a usual manner and in some low end recorders control and ECC data from microprocessor 40.

FIGS. 11 and 12 illustrate fabrication of an optical disk 30. It is to be appreciated that in fabricating masters and replicas use the current known and widely employed mastering and stamping processing for making replicas, such as disk 30. At computer-aided step 270 the sector size, spiral track revolutions per radial unit (inches or centimeters) TPI is determined, size of addressable track, the inner and outer radial limits of the recording area of disk 30 (represented by bands 101–106 and in Tables 1 and 2), selecting the number of bands (preferably a number to the base 2), number of revolution groups in each band and the extent of each revolution group. It is assumed in this design step that the preferred embodiment of equal sized bands and revolution groups are being selected, no limitation thereto intended. The radial extents of bands and revolution groups may vary with radius, the number of revolution groups in a band may vary from band to band.

An important part of the design is to set the anchor sectors 115,116 in design step 271. This design step requires consideration of the capabilities of a mastering machine 250 (FIG. 11) to be used in making a master disk from which replica disks are fabricated. An important aspect of fabricating disk 30 is to limit cumulative tolerances in circumferentially locating sectors on the disk. Such tolerance limiting is achieved by establishing anchor sectors 115, 116 to be precisely circumferentially located at reference position 100. Such precise circumferential location is a part of the design of known mastering machines as next described.

Mastering machine 250 includes a precisely mounted and rotated platter 251 upon which precision glass disk 252 is placed. A synchronous motor 253 mounts platter 251 on shaft 254 for rotation. Gearing may separate platter 251 from motor 253 for enabling the use of a more precise bearing support. Spindle 254 has an accurately located index mark 256 used in the fabrication process to accurately identify circumferential reference position 100 and to accurately locate each anchor sector 115, 116. Mastering machine 250 includes a laser master system 257 that includes precision optics for emitting a master disk ablating laser beam over light path 258. Gearing, not shown, precisely relatively moves system 257 and platter 251 for precisely creating a spiral groove in master disk along with undulations in the groove that precisely identify the sectors, i.e. fields C, T and S of sector field 117 (FIG. 3). The precise locations of sector field 117 of sectors other than anchor sectors 15, 116 are determined by accurately measuring the angular displacement of platter 251 rotation, such as by RPS system 60. Mastering program control 259 is programmed with the design information generated in steps 270 and 271, in a known manner, and in performing machine step 272 responds to RPS system 260, including the critical index mark 256, to actuate laser master system 257 to create the spiral groove with sector marks for creating a master disk 252 usable to create disk replicas having a format using the present invention.

Once master disk 252 has been created in machine step 272, the quality and completeness of the master disk is verified in testing step 273. Once the master disk is qualified, then at fabrication step 274 the FIG. 11 illustrated fabrication continues. Master disk 252 is used in make stamper step 265 to make so-called stampers or dies from which disk replicas can be molded. Such stampers are usually created by vapor depositing or sputtering a metallic coating on the grooved face of master disk 252. More than one stamper may be made in one session of vapor deposition. The stampers are removed from the master disk, qualified and then indicated as being suitable for making replicas. In the make replica step 266, replicas are preferably injection molded to faithfully reproduce the mirror image of the stamper, i.e. the true image of master disk 252. The mastering machine accuracy in creating sector marks based on angular displacement of the mastering disk provides an inventive format having an anchor sector every seventeen spiral disk revolutions, for example. The circumferential precession of sectors and addressable tracks being linear is precisely controlled by present day mastering machines. Either single-sided or two-sided disks can be fabricated. Such two-sided disks may have reversed spiral grooves on opposite recording sides, such as discussed above with respect to FIG. 2.

The mastering machine need not be optical. A magnetic servo surface is recorded using known servo writing techniques. In this instance no replicas are made, except if magnetic printing is employed. In this latter instance, the remanent magnetic field of the master disk supplies a field intensity sufficient for magnetically printing the format on the magnetic disk replicas.

FIG. 13 illustrates an alternate formatting arrangement while practicing the present invention. The angular precession of addressable tracks and sectors still occurs, however, within each band the sectors are radially aligned. One band 280 of a plurality of spiral track revolutions and revolution groups has angular displaced radially-aligned sector 281 such that the sector fields 117 (FIG. 3) create radial lines separating the sectors 281 Since addressable track extent is not contiguous with spiral track revolution extents, the above-described circumferential precessing occurs. This embodiment again shows an advantage of making the angular extent of addressable tracks independent of the angular extent of spiral track revolutions.

FIG. 14 illustrates applying the present invention to CKD formatted addressable tracks. A portion 290 of a single spiral track on a data-storing disk is shown. The circumferential reference position 100 is indicated by two dimension lines enumerated 100. The constant length CKD addressable track has the same size as the addressable track described above for fixed block architecture (FBA) disks having constant capacity addressable sectors. The prior art CKD tracks as formatted on a disk (not virtual tracks) as one of a large plurality of concentric disk revolutions, also termed tracks in the prior art. In the prior art CKD disks, a single radially extending index line (usually recorded only on the so-called servo surface of a stack of co-axial co-rotation data storing disks) precisely indicated the disk's circumferential position, commonly referred to as "index". The single radially-extending index line indicated the beginning and end of each of the CKD tracks. As shipped from a factory, the only indicium on a CKD track is the single index line recorded on the servo surface. Initialization of a CKD disk included a surface analysis and writing a control record, termed "home address" or HA on each data recording surface. Every HA is recorded to be immediately circumferentially adjacent the index line of the servo surface as that index is imposed on the data disks via the comb head assembly. Index of each CKD track on all data recording surfaces is determined by the servo surface index line. The placement of HA is such that HA is the first record to be read from any CKD track on the data recording surfaces after scanning the index line on the servo surface.

For backward compatibility with the prior art CKD formatted disks, each addressable CKD track 295 is indicated by a single embossed or recorded pseudo index mark 291. As shown in FIG. 14, one of the addressable CKD tracks 295 has its pseudo index mark aligned with circumferential reference line 100. As such, this CKD track 295-A is an anchor addressable CKD track. HA in such anchor addressable CKD track is termed an anchor HA. Such anchor HA may include a recorded indication that it is an anchor HA. Since in a CKD formatted track there are no sectors, there can be no anchor sectors. As a substitute for the CKD track, an entire track is the above-described anchor HA or anchor addressable CKD track. The CKD required HA record 292 is recorded immediately circumferentially adjacent respective ones of the pseudo index marks. A gap 293 preferably separates each HA from its respective pseudo index mark location. The formatting of the rest of each addressable CKD track area 296 uses the prior art CKD format. A host processor addressing the addressable CKD tracks finds identity of such addressing with the prior art addressing for identical capacity CKD tracks. The circumferential locations of the pseudo index marks precess as described for the sector precessing. FIG. 14 illustrates the circumferential reference position 100 dissecting a second addressable CKD track 295-B in the same manner as described for the FBA formatted addressable tracks and sectors. In a multiple recording surface assembly of co-axial co-rotating disks, the recorded or embossed pseudo index marks are only on the servo surface. Reading the pseudo surface index marks identifies the beginning of each CKD track in the same cylinder of tracks, i.e. CKD tracks having the same radial position.

Each revolution group GO–GK (FIG. 4) has an integral number of the addressable CKD tracks. The pseudo index mark at 297 is a full equivalent of the sector field 177 of each anchor sector 115 and 116. The bands 101–106 are the same as for the described FBA formatted addressable tracks. The inventive device activity for efficiently crossing band boundaries and the mastering processes for CKD formatted addressable tracks are the same as for the FBA formatted tracks. Therefore, the present invention is not limited to any particular track format.

Figure 15:
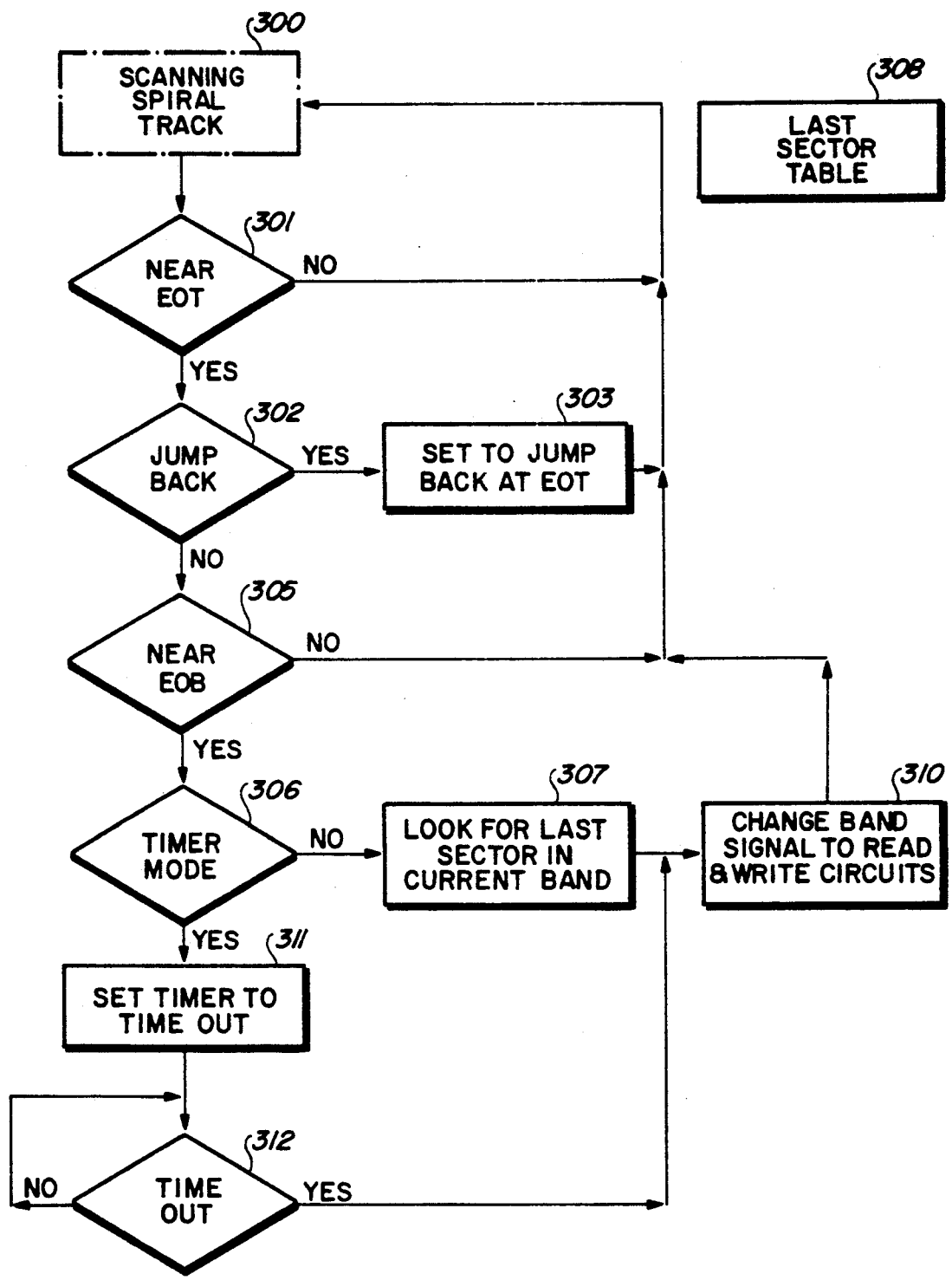
FIG. 15 is a simplified machine operations chart showing certain operations related to control of scanning addressable tracks using the FIG. 1 illustrated device for control of jump back and traversing band boundaries.

FIG. 15 shows scanning sectors on the spiral track. Dashed line box 300 represents microprocessor 40 monitoring the scanning operation. Such scanning can be in connection with searching for an addressable track or a sector of an addressable track, reading, erasing or recording operations or diagnostic/calibrating functions beyond the scope of the present description. In the described FBA formatted disk, the sector numbers indicate end of an addressable track (EOT). With 17 sectors per addressable track, sector 16 is a last sector in each addressable track. As microprocessor 40 detects reading of any sector field 117, microprocessor 40 in machine step 301 checks whether or not the sector to be scanned is sector 16. If the sector being scanned is not sector 16, then EOT is not "near" the current scanning circumferential position. In this instance, microprocessor continues monitoring scanning the spiral track. If at machine step 301 the sector being scanned is sector 16, then EOT is near.

If EOT is "near", then microprocessor 40 in machine step 302 checks whether or not one of the addressable tracks is being repeatedly scanned. Such repeated scanning of on addressable track is similar to the stop motion function in spiral track video disk players. It is remembered that in the illustrated embodiment, each addressable track has a smaller angular extent than one revolution of the spiral track. The jump back of lens 45 to scan the revolution having the addressed track being scanned occurs immediately at EOT of such track. The scanning of the remainder of this revolution toward the addressed track is monitored by microprocessor processor 40. As scanning approaches the addressed track the FIG. 1 illustrated device prepares for reading the addressed track in a usual manner. If a jump back is indicated at machine step 302, then jump back is set to occur at EOT, i.e. at end of the current sector being scanned. Otherwise, microprocessor 40 proceeds to machine step 305 for determining whether or not a band boundary is being approached, i.e. end of the current band (EOB). Note, if there is a jump back at EOT, then the band boundary is never crossed. EOB is detected by microprocessor 40 by comparing the addressable track number with all of the last addressable tracks to be scanned in each of the bands 101–106 in last sector table 308. Last sector table 308 is generated before scanning of the spiral track occurs. Table 1, supra, identifies each last addressable track in each band, i.e. the highest numbered addressable tracks for the bands are last sector table 308 for identifying the last addressable track in the respective bands. As an alternate, microprocessor 40 can calculate the last addressable track is each band on a real time basis.

If EOB is being approached, microprocessor 40 at machine step 306 determines which mode (timer or circumferential scan position) of initiating traversal of the band boundary 170 is to be used. Determination of mode selection is beyond the scope of the present specification. If the selected mode requires a time out from the beginning of last sector 188 (FIG. 7) of a band's last addressable track 174, then microprocessor 40 in machine step 311 sets a software time out timer (not shown) for timing the scanning of the last sector 188. Upon the timer timing out in machine step 312, the line 220 signal is changed in machine step 310 for indicating the next band being scanned. From machine step 310, microprocessor continues monitoring the scanning in machine step 300.

If the circumferential position mode is detected in machine step 306, then microprocessor 40 monitors for the end of the current sector 188. The detected end of the data field in sector 188 indicates the onset of scanning interband gap 186. At this time, microprocessor 40 executes machine step 310.

As pointed out above, last sector 188 may be denominated as a non-data-recording sector. In this instance, upon detection of sector field 117 of last sector 188, microprocessor 40 sends a new band signal over line 220.

Figure 16:
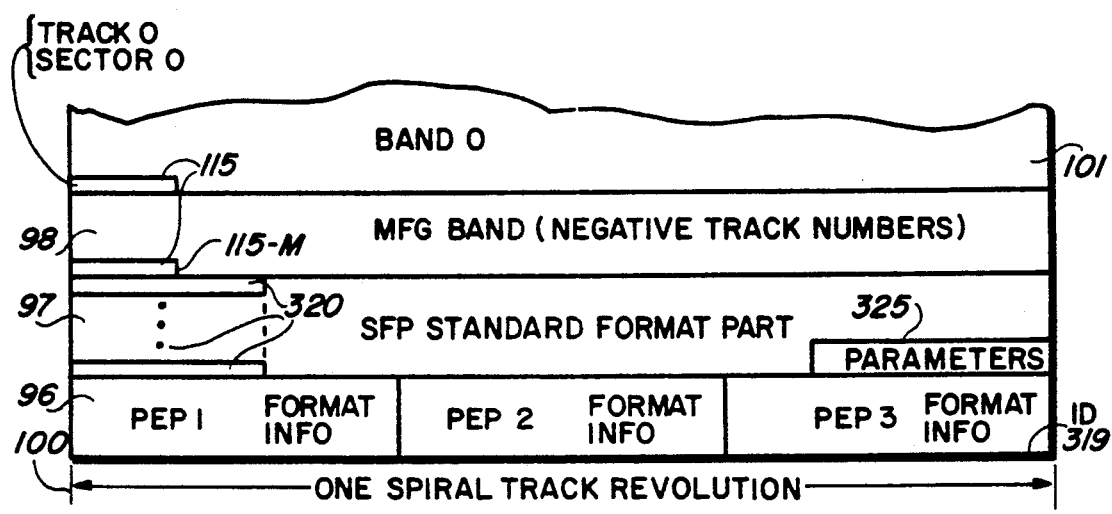
FIG. 16 diagrammatically illustrates a so-called control area of a data-storing disk implementing the present invention.

Referring next to FIG. 16, exemplary effects of practicing the present invention on control area 96-98 of disk 30 is described. Phase-Encoded Part (PEP) 96 is a usual low density extra wide radially inner-most revolution of the single spiral track. All disk players or drives read PEP 96 for making an initial evaluation a disk 30 received into a disk receiver (not shown) that places a disk 30 in the FIG. 1 illustrated play position. PEP 96 has three sectors having embossed or molded identical disk describing data. Such disk describing data includes capacity, laser related parameter data (power levels, disk reflectivity, type of disk, e.g. ROM, MO etc), and sector size (data storing capacity, e.g. 512 or 1024 bytes).

The next radially outer revolutions contain a Standard Format Part (SFP) 97 having recorded disk describing data(data is recorded by molding to create embossed recording) at a standard (ISO/ANSI) format and density. The SFP disk describing data repeats the PEP 96 stored data plus more detailed data (not required). Each addressable SFP track is co-extensive with each spiral track revolution, i.e. uses prior art format. As such, the first sector 320 in each SFP track (not separately shown) has one end circumferentially aligned with reference position 100. As such, each sector 320 identifies the location of reference position 100. The angular extent of the SFP 97 sectors is usually greater than the settor angles used in the illustrated embodiment, no limitation thereto intended. SFP 97 area has a preset number of SFP track-revolutions. SFP 97 is also often used for calibrating laser 67 to each received disk 30. In accordance with the invention, later-identified linear precessing/progression format-parameter data are stored in parameters area 325. Such parameter data include data indicating how to perform a seek operation as set forth in FIG. 8. That is, the linear progression parameter data that indicate circumferential precession of the addressable entities (tracks and/or sectors), linear progression of the number of addressable entities in successively radially outer bands 101-106 on the disk, linear progression of changes in frequency of operation of a device in the respective radial bands, the number of bands, configuration data relating to revolution groups and the like. Relating the above statement to the equations describing the FIG. 8 illustrated seek operation, the symbols N, K, S, B, n, T, t, M, R, RF, SR, BF, etc. are listed in the linear precessing/progression format parameter data area 325. In the event that in practicing the present invention in a manner that results in any non-linear precession or progression in format with disk circumference or radius, then such nonlinear parameter data are also included in parameters area 325.

PEP 96 and SFP 97 have revolution pitches and formats in accordance with the prior art. Manufacturing (MFG) band 98 is preferably constructed in accordance with the presently invention. The addressable track enumeration uses negative numbers for distinguishing the control area 96-98 from the data storing areas in bands 101-106. The number of addressable tracks in MFG 98 are preset such that a continuous set of track addresses with increasing negative track numbers extends radially inward to PEP 96. MFG 98 has an integral number of revolution groups, one such group is shown as comprising MFG 98. The data-storing capacity of the sectors, is any, in MFG 98 can be different than the data-storing capacity of sectors in other areas of disk 30. It is preferred that the data-storing capacity of sectors in MFG 98 be identical to that used in bands 101-106. Anchor sector 115-M anchors the sectors and addressable tracks of MFG 98 to reference position 100. Immediately radially outward of MFG 98 is band 101, numbered 0 having anchor sector 115 as sector 0 of addressable track 0 of all bands 101-106. The interband transition between MFG 98 and band 101 is as described in FIG. 7 for band transition 170.

While the invention has been particularly shown and described with reference to preferred embodiments thereof, it will be understood by those skilled in the art that various changes in form and details may be made therein without departing from the spirit and scope of the invention.

What is claimed is:

1. A data-storing disk apparatus having a spiral track extending between a predetermined outer-radial position and a predetermined inner-radial position, the spiral track having a plurality of revolutions, a reference angular position extending radially of the spiral, each of said revolutions extending circumferentially between two radially displaced locations of said reference angular position, the improvement comprising:

a predetermined plurality of data-storing addressable entities respectively disposed in predetermined portions of said spiral track, each said predetermined portion being a revolution group of a given number of said revolutions, said given number being greater than one, said predetermined portion having two group ends in said spiral track, both of said ends respectively circumferentially aligned with said radial position;

first and second ones of said data-storing addressable entities respectively having a given end abutting said reference angular position;

a non-integral number of said data-storing addressable entities disposed in each of said given number of revolutions; and a predetermined plurality of said data-storing addressable entities being disposed between said first and second ones of said data-storing addressable entities in said given number of revolutions.

2. The data-storing disk apparatus set forth in claim 1, further including, in combination;

all of said data-storing addressable entities having identical data-storing capacities.

3. The data-storing disk apparatus set forth in claim 1, further including, in combination:

addressable entity identifying indicia in each of said data-storing addressable entities for indicating a relative position of each of said data-storing addressable entities in said spiral track with respect to all other of said data-storing addressable entities in said revolution group.

4. The data-storing disk apparatus set forth in claim 3, further including, in combination:

each of said data-storing addressable entities being addressable sectors having first and second contiguous portions extending along said spiral track;

said first portion in each of said sectors storing said addressable entity identifying indicia and said second portion in each of said sectors for storing data; and all of said first portions being at the same circumferential end portion of said sectors, respectively.

5. The data-storing disk apparatus set forth in claim 4, further including, in combination:

all of said data-storing sectors in each of said groups having identical angular extents as fixed-size data-storing sectors;

a first plurality of said fixed-sized data-storing sectors constituting an addressable track;

said addressable entity identifying indicia in said fixed-size sectors indicating the addressable tracks, respectively;

an integral number of said addressable tracks being in each of said revolution groups and a non-integral number of said addressable tracks in any one of said revolutions in each of said revolution groups.

6. The data-storing disk apparatus set forth in claim 5, further including in combination:

a predetermined number of said revolution groups being disposed in a radially adjacent relation on said disk apparatus, each of said second plurality of groups constituting a band of said revolutions;

a second plurality of said bands being disposed on said disk apparatus in radially adjacent relation;

all of said fixed-size sectors in each of said bands having identical angular events along said spiral track; and said angular extents in said bands respectively decreasing in size with increased radial outward displacement of said bands on said data-storing disk apparatus.

7. The data-storing disk apparatus set forth in claim 6, further including, in combination:

each of said bands disposed in like-sized radial portions of said data-storing disk apparatus.

8. The data-storing disk apparatus set forth in claim 7, further including, in combination:

said second plurality being a number equal to $2^n$ wherein n is an integer whereby a frequency of operation for reading and writing data from and to said sectors in the respective bands varies as $2^k$ wherein k is an integer such that an integer binary count represents changes in frequency of said reading and writing to enable digital count circuits to change frequency of operation of a data-storing disk apparatus drive to read from and write to the data-storing disk apparatus.

9. The data-storing disk apparatus set forth in claim 8, further including, in combination:

a predetermined one of said fixed-size data-storing sectors storing an addressing table consisting of an input address portion having a contiguous set of input addresses and an output address portion identifying one of said fixed-sized data-storing sectors for each of said input addresses.

10. The data-storing disk apparatus set forth in claim 1, further including, in combination;

said data-storing disk apparatus exhibiting optical read and write characteristics; and said spiral track being identified by a continuous spiral groove on said disk apparatus.

11. The data-storing disk apparatus set forth in claim 1, further including, in combination:

a first disk surface means having a continuous spiral groove therein extending between said predetermined outer and inner radial positions; and said spiral track being on a second disk surface and having an identical spiral configuration and extent as said groove such that the spiral track can be scanned by apparatus scanning said spiral groove and having a transducer facing said spiral track and positioned on the spiral track by said apparatus scanning said spiral groove.

12. The data-storing disk apparatus set forth in claim 1 further including, in combination:

said disk apparatus including a plurality of co-axial co-rotating surface means; and each of said surface means including a continuous one of said spiral tracks, each of said spiral tracks having a plurality of said revolution groups.

13. A data-storing disk apparatus as set forth in claim 1, further including, in combination:

said addressable entities being addressable tracks, each said addressable track having an angular length of other than 360° or a multiple thereof;

each of said addressable tracks for storing a plurality of addressable subentities of data; and every nth one of said addressable tracks ending at said reference line, n being an integer.

14. The data-storing disk apparatus set forth in claim 13, further including, in combination:

said addressable tracks being banded into a plurality of radially displaced bands of said revolutions;

every (n+k)th one of said addressable tracks in said respective bands ending at said reference line, k being a number identifying the radial position of the respective bands as counted from said inner radial position, said radially inwardmost band being band 0 with band numbers increasing by an integer value with increasing radial position of said bands.

15. The data-storing disk apparatus set forth in claim 14, further including, in combination:

in each of said bands, each of said addressable tracks extending along the spiral track an identical angle; and each of said addressable tracks in different bands extending along the spiral track a different angle, the angular extent of each track in respective radially-outwardly disposed bands decreasing with radius.

16. The data-storing disk apparatus set forth in claim 14, further including, in combination:
an angular density of recorded data and indicia in said bands increasing with radial displacement of said bands respectively, each band having one angular density of data and indicia.

17. The data-storing disk apparatus set forth in claim 13, further including, in combination:
said addressable tracks being banded into a given plurality of radially displaced bands of said revolutions; and
said number of addressable tracks and an angular density of recorded data and indicia in the respective bands increasing in predetermined respective linear progressions with radially outward increasing positions of said bands.

18. The data-storing disk apparatus set forth in claim 17, further including, in combination:
each of said bands having a like number of said revolutions; and
said given plurality being $2^N$ where N is an integer.

19. The data-storing disk apparatus set forth in claim 18, further including, in combination:
each of said tracks having a like plurality of data-storing sectors, each of said data-storing sectors having address indicia indicating the address in said data-storing disk apparatus of said each data-storing sector; and
one of said data-storing sectors having address translation indicating means for translating a logical continuous address space into track and sector address of said data-storing disk apparatus.

20. In the data-storing disk apparatus set forth in claim 13 further including, in combination:
each of said addressable subentities having machine-sensible indicia for addressably identifying each respective one of said subentities.

21. In the data-storing disk apparatus set forth in claim 20 further including, in combination:
said machine-sensible indicia in each of said subentities being recorded at the same time that the subentity was recorded including any data recorded in said subentity.

22. In the data-storing disk apparatus set forth in claim 21 further including, in combination:
each of said addressable tracks having a machine-sensible home address record for identifying the beginning of the respective tracks.

23. In the data-storing disk apparatus set forth in claim 21 further including, in combination:
each of said subentities having said indicia embossed and identifying both said addressable track and subentity.

24. In the data-storing disk apparatus set forth in claim 20 further including, in combination:
each of said addressable tracks having an extent for having one of first or second plurality of said subentities, said fist plurality being fewer than said second plurality; and
each of said first plurality of subentities having a data storing capacity in bytes equal to twice a number of data bytes as a data storing capacity of each of said second plurality of substantial.

25. In the data-storing disk apparatus set forth in claim 24 further including, in combination:
said machine-sensible indicia in each of said subentities being embossed indicia.

26. In the data-storing disk apparatus set forth in claim 1 further including, in combination:
said disk apparatus having n bands, wherein n is a positive integer; and
a ratios of an outer diameter to an inner diameter of a recording area having said n bands being a ratio of $(1+n):1$.

27. In the data-storing disk apparatus set forth in claim 1 further including, in combination:
a predetermined number of said revolution groups being disposed in a radially adjacent relation on said disk apparatus, each of said predetermined number of said revolution groups constituting a band of said revolution, there being a given plurality of said bands on said data-storing disk apparatus;
said bands being disposed on said disk apparatus in radially adjacent relation; and
boundaries between radially adjacent ones of said bands being indicated solely by said entities having a different angular extend in the respective radially adjacent ones of said bands.

28. In the data-storing disk apparatus set forth in claim 1 further including, in combination:
the disk apparatus having machine-sensible indicia indicating addresses of predetermined ones of said addressable entities for directly addressing said predetermined ones of said addressable entities, respectively; and
said predetermined ones of said addressable entities excluding said first one addressable entity.

29. In the data-storing disk apparatus set forth in claim 28 further including, in combination:
means on said disk apparatus indicating that said first one addressable entity is a spare entity to be used only when one of said predetermined ones of said addressable entities cannot record readable data.

30. In the data-storing disk apparatus set forth in claim 29 further including, in combination:
a predetermined number of said addressable entities being disposed to be circumferentially adjacent said first one of said addressable entities; and
said means on said disk apparatus indicating that said first one addressable entity is a spare entity to be used only when one of said predetermined ones of said addressable entities cannot record readable data also indicating said circumferentially adjacent addressable entities are spare entities and are not included in said predetermined ones of said addressable entities.

31. In the disk apparatus set forth in claim 28 further including, in combination:
means on the disk apparatus indicating that said first one addressable entity cannot be used to record data.

32. In the data-storing disk apparatus set forth in claim 1 further including, in combination:
each of said data-storing addressable entities being a CKD track; and
CKD machine sensible indicia recorded in a spirally spaced-apart relation in said spiral track for indicating a beginning of each of said CKD tracks such that said CKS indicia are spaced apart an angular spacing other than an integral angular extend of at least one of said revolutions.

33. In the data-storing disk apparatus set forth in claim 32 further including, in combination:
said CKD machine sensible indicia being indelibly recorded on said spiral track.

34. In the data-storing disk apparatus set forth in claim 32 further including, in combination:
predetermined ones of said CKD tracks having a home address record recorded immediately adjacent said CKD machine sensible indicia.

35. In the data-storing disk apparatus set forth in claim 1 further including, in combination:
said disk apparatus having two oppositely facing recording surfaces;
one of said recording surfaces having said spiral track, said spiral track being scanned in a first direction extending from said inner-radial position to said outer-radial position; and
a second one of said recording surfaces having a reverse spiral track extending from said outer-radial position to said inner-radial position for being scanned from said outer-radial position toward said inner-radial position wherein said spiral tracks on said one and second recording surfaces respectively having reversed spirals such that rotation of the disk apparatus in one rotational direction enables scanning either of said spirals during said rotation.

36. In the data-storing disk apparatus set forth in claim 1 further including, in combination:
a control area at a first one of said radial positions having a plurality of radially contiguous ones of said revolutions;
a first portion of said control area having control tracks that are co-extensive with respective ones of said spiral track revolutions;
self-identifying indicia in said first portion for identifying the disk apparatus as having said non-integral number of addressable entities in ones of said revolutions;
a second portion of said control area having parameter addressable entities in a parameter data one of said revolution groups such that the angular extent of the respective parameter addressable entities are the same as the angular extent of said fixed-sized data-storing addressable entities; and
parameter data stored in said second portion identifying said non-integral number of said addressable entities in ones of said revolutions.

37. In the data-storing disk apparatus set forth in claim 36 further including, in combination:
a predetermined number of said revolution groups being disposed in a radially adjacent relation on said disk apparatus, each of said second plurality of groups constituting a band of said revolutions;
a second plurality of said bands being disposed on said disk apparatus in radially adjacent relation;
all of said sectors in each of said bands having identical angular extents along said spiral track;
said parameter data revolution group having parameter addressable entities each having an angular extent equal to the angular extent of a radially adjacent one of said bands; and
said angular extents in said bands respectively decreasing in size with increased radial outward displacement of said bands on said data-storing disk apparatus.

38. In the data-storing disk apparatus set forth in claim 36 further including, in combination:
a spiral groove on said disk apparatus for identifying said spiral track and extending between said predetermined outer-radial position and said predetermined inner-radial position;
each of said plurality of addressable entities having a constant-data-storage-capacity;
said spiral track being divided into a first predetermined number of radial bands,
each band having a given predetermined number of said revolutions of said spiral track, each band having a different plurality of data-storing addressable entities, the data-storing addressable entities in said bands respectively subtending different angles on the disk, the radially outer ones of said bands having ones of said addressable entities that each subtend smaller angles than respective ones of said addressable entities disposed in radially inward ones of said bands,
said first and second ones of the addressable entities in the respective bands being disposed at the respective radially inward and outward ends of the bands, hereinafter termed first and second band-end addressable entities, having one respective end disposed at said reference angular position and sectors in said band disposed intermediate said band-end addressable entities having ends not disposed at said reference annular position including predetermined ones of said intermediate sectors extending across said reference angular position.

39. In the data-storing disk apparatus set forth in claim 36 further including, in combination:
said self-identifying indicia in said first portion of said control area including an indication of a linear circumferential precession rate of said addressable entities with respect to said reference angular position.

40. In the data-storing disk apparatus set forth in claim 39 further including, in combination:
said self-identifying indicia in said first portion of said control area further including indications of a number of said revolution groups in each of said bands, a number of said bands on said disk apparatus, identifying data of the addressable entities as to data storing capacity, a number of additional ones of said addressable entities in radially outer ones of said revolution groups and bands and seek indicating parameter data that enables seeking from a current one of said addressable entities to a target one of said addressable entities by counting said revolutions disposed between said current and target ones of the addressable entities.

41. In the data-storing disk apparatus set forth in claim 40 further including, in combination:
said first portion of said control area having a plurality of parameter storing sectors having respective portions of said self-identifying indicia; and
predetermined ones of said plurality of parameter storing sectors having an end circumferentially aligned with said reference angular position for identifying said reference angular position.

42. In the data-storing disk apparatus set forth in claim 41 further including, in combination:
a replica of said second portion of said control area and a first predetermined part of said first portion of said control area being disposed at a second one of said radial positions; and
said replica of said second portion and said second portion of said control area respectively having addressable entities that each subtend an angle equal to the angles respectively subtended by addressable entities in ones of said bands immediately radially adjacent thereto.

43. In the data-storing disk apparatus set forth in claim 1 further including, in combination:
a predetermined number of said revolution groups being disposed in a radially adjacent relation on said disk apparatus, each of said predetermined number of said revolution groups constituting a band of said revolution;
a second plurality of said bands being disposed on said disk apparatus in radially adjacent relation;
an inter-entity gap between each of said circumferentially adjacent ones of said addressable entities, each said inter-entity gap having a predetermined angular extend in respective ones of said bands; and
inter-band gaps between adjacent ones of said bands having an angular extent greater than an angular extend of any of said inter-entity gaps in said adjacent ones of said bands.

44. In the data-storing disk apparatus set forth in claim 43 further including, in combination:
said addressable entities being like-sized disk sectors;
a predetermined number of said disk sectors being addressable as one addressable track; and
each revolution containing a non-integral number of said addressable tracks.

45. The data-storing disk apparatus set forth in claim 1, further including in combination:
a second plurality of radial bands on said data-storing disk apparatus;
each said band having a predetermined number of said revolution groups disposed in a radially adjacent relation on said disk apparatus;
said second plurality of said bands being disposed on said disk apparatus in radially adjacent relation;
said angular extents of said addressable entities in respective ones of said bands decreasing in size with increased radial outward displacement of said bands on said data-storing disk apparatus; and
each of said bands yielding a read back signal having a different frequency than a frequency of a read back signal from any other bands and a change in frequency between radially adjacent ones of said bands being less than 7%.

46. In the data-storing disk apparatus set forth in claim 45 further including, in combination:
each of said bands having a like number of said revolution groups; and
said second plurality being $2^N$ where N is an integer.

47. In the data-storing disk apparatus set forth in claim 45 further including, in combination:
a number of said addressable entities in each of said bands increasing with radius of said bands in a linear progression of additional number of said entities in radially outer ones of said bands; and
circumferential location of said addressable entities with respect to said reference angular position precessing in respective ones of said bands in an increasing rate that changes with radius of said outer bands at a linear rate.

48. An optical disk apparatus having a spiral groove for identifying a spiral track and extending between a predetermined outer radial position and a predetermined inner radial position, said spiral track having a plurality of revolutions;
a reference angular position on said disk, a plurality of addressable constant-capacity data-storage sectors in said spiral track,
said spiral track being divided into a first predetermined number of bands,
each band having given predetermined numbers of said revolutions of said spiral track, each band having a different plurality of data-storing sectors, the data-storing sectors in respective ones of said bands subtending different angles on the disk, the radially outer ones of said bands having sectors subtending smaller angles than radially inward ones of said bands,
each of said revolutions in said bands having a non-integral number of said sectors, said sectors in the respective bands being disposed at the respective radially inward and outward ends of the bands, hereinafter termed band-end sectors, having one respective end disposed at said reference angular position and sectors in said band disposed intermediate said band-end sectors having ends not disposed at said reference annular position including predetermined ones of said intermediate sectors extending across said reference angular position.

49. In the optical disk apparatus set forth in claim 48 further including, in combination:
predetermined ones of said sectors being disposed circumferentially adjacent predetermined ones of said band-end sectors; and
said predetermined ones of said band-end sectors and said predetermined ones of said sectors being spare sectors for recording data that was intended to be stored in a sector incapable of storing data.

50. In the optical disk apparatus set forth in claim 49 further including, in combination:
a control area at a first one of said radial positions and having a plurality of radially contiguous ones of said revolutions;
a first portion of said control area having control tracks that are co-extensive with respective ones of said spiral track revolutions;
self-identifying indicia in said first portion for identifying the disk apparatus as having said non-integral number of addressable entities in ones of said revolutions;
a second portion of said control area having parameter addressable entities in a parameter data one of said revolution groups such that the angular extent of the respective parameter addressable entities are the same as the annular extent of said fixed-sized data-storing addressable entities; and
said self-identifying indicia including indications of parameter data identifying said non-integral number of addressable entities in ones of said revolutions.

51. In the optical disk apparatus set forth in claim 48 further including, in combination:
a predetermined number of said sectors being an addressable track;
each said revolution having a non-integral number of said addressable tracks; and
each one of said addressable tracks having a circumferential extent for having either an integral number of first or second data-storing capacity sectors wherein at least one integral number of said first and second capacities are for storing substantially different number of bytes of data.

52. In a disk apparatus for storing data in spaced-apart addressable entities disposed in a spiral track in said disk apparatus, a plurality of revolutions in said spiral track, each of said revolutions beginning and ending at a constant circumferential reference position on said disk apparatus;

including, in combination:
- each of said addressable entities having an angular extent that is other than an angular extent equal to, an integral submultiple of or a integral multiple of an angular extent of any one of said revolutions;
- each of first predetermined ones of said addressable entities having an end aligned with said reference position, said first predetermined ones of said addressable entities being disposed in respective revolutions that are radially spaced apart a predetermined number of revolutions such that a linear array of said radially space-apart first predetermined one of said addressable entities is disposed along said reference position; and
- all of said addressable entities other than said first predetermined ones of said addressable entities being disposed on said spiral track such that either said reference position is circumferentially remote from said other addressable entities or dissects said other addressable entities.

53. In the disk apparatus set forth in claim 52 further including, in combination:
- all of said other addressable entities being disposed in said spiral track respective predetermined angular displacements from respective predetermined ones of said first predetermined addressable entities; and
- an integral number of said other addressable entities being disposed respectively between radially successive ones of said radially spaced apart first predetermined ones of said addressable entities.

54. In the disk apparatus set forth in claim 53 further including, in combination:
- said addressable entities being addressable data-storing tracks, each of said addressable data-storing tracks for storing a like-number of data bytes;
- said first predetermined ones of said addressable data-storing tracks being radially spaced-apart a constant radial distance such that a like number of said revolutions are disposed between an two radially successive ones of said first predetermined ones of said addressable data-storing tracks;
- said first predetermined ones of said addressable data-storing tracks having a leading end disposed at said reference position, said leading end being an end to be first scanned by any transducer scanning said spiral track;
- second predetermined ones of said addressable data-storing tracks having respective trailing ends disposed adjacent said reference position, said trailing ends being an end of each data-storing track that is last scanned by a transducer scanning said spiral track; and
- a gap disposed between each respective first and second predetermined ones of said addressable data-storing tracks.

55. In the disk apparatus set forth in claim 54 further including, in combination:
- said revolutions being grouped into a plurality of radial bands, each radial bands including a plurality of said first and second predetermined ones of said addressable data-storing tracks; and
- said addressable data-storing tracks in respective ones of said radial bands subtending a different angle than addressable data-storing tracks in any other of said radial bands.

56. In the disk apparatus set forth in claim 55 further including, in combination:
- said angle subtended by said addressable data-storing tracks decreasing from an inner radius to an outer radius of said spiral track in a linear progression; and
- a number of said addressable data-storing tracks in each of said radial bands increasing with radius in successive radially outer ones of said bands of revolutions in a linear progression.

57. In the disk apparatus set forth in claim 56 further including, in combination:
- a number of said radial bands being equal to $2^n$, where n is a positive integer.

58. In the disk apparatus set forth in claim 55 further including, in combination:
- said addressable tracks in each of said bands storing signals at a given frequency of recording or reading and addressable entities in different bands storing said signals at different frequencies, said frequencies increasing as the radius of said bands increase; and
- said frequency change between radially adjacent ones of said bands being less than seven per cent.

59. In the disk apparatus set forth in claim 55 further including, in combination:
- an inter-track gap between each of said circumferentially adjacent ones of said addressable tracks, each said inter-entity gap having a predetermined angular extent in respective ones of said bands; and
- inter-band gaps between adjacent ones of said bands having an angular extent greater than an angular extent of any of said inter-track gaps in said adjacent ones of said bands.

60. In the disk apparatus set forth in claim 55 further including, in combination:
- predetermined contiguous ones of said addressable tracks being spare tracks; and
- said spare tracks being disposed at one of said radial positions.

61. In the disk apparatus set forth in claim 55 further including, in combination:
- each of said bands having a predetermined number of said first predetermined addressable tracks; and
- each of said first predetermined addressable tracks being radially spaced from a radially adjacent one of said first predetermined addressable tracks in each said band by a plurality of said revolutions.

62. In the disk apparatus set forth in claim 55 further including, in combination:
- a control area at a first one of said radial positions having a plurality of radially contiguous ones of said revolutions;
- a first portion of said control area having control tracks that are co-extensive with respective ones of said spiral track revolutions;
- self-identifying indicia in said first portion for identifying the disk apparatus as having said non-integral number of addressable entities in ones of said revolutions;
- a second portion of said control area having parameter addressable entities in a parameter data one of said revolution groups such that the angular extent of the respective parameter addressable entities are the same as the angular extent of said fixed-sized data-storing addressable entities; and parameter data stored in said second portion identifying said non-integral number of said addressable entities in ones of said revolutions.

63. In a disk apparatus for storing data in spaced-apart addressable entities disposed in a spiral track in said disk apparatus, a plurality of revolutions in said spiral track, each of said revolutions beginning and ending at a constant circumferential reference position on said disk apparatus;

including, in combination:

each of said addressable entities having an angular extend that is other than an angular extend equal to an integral submultiple of or a integral multiple of an angular extent of any one of said revolutions;

each of first predetermined ones of said addressable entities having an end aligned with said reference position, said first predetermined ones of said addressable entities being disposed in respective revolutions that are radially spaced apart a predetermined number of revolution such that a linear array of said radially spaced-apart first predetermined ones of said addressable entities is disposed along said reference position;

all of said addressable entities other than said first predetermined ones of said addressable entities being disposed on said spiral track such that either said reference position is circumferentially remote from said other addressable entities or dissects said other addressable entities; and said addressable entities being grouped into a plurality of contiguous radial bands, each band including a plurality of said first predetermined ones of said addressable entities, each outer radial band having addressable entities that respectively subtend smaller angles in successively outer ones of said band, said angles decreasing in size in a linear progression with radius of said bands.

64. In the disk apparatus set forth in claim 63 further including, in combination:

circumferentially successively adjacent ones of said addressable entities having successive circumferential positions that precess linearly circumferentially a non-subintegral of one of said revolutions; and said successively outer radial bands having recorded signals in respective ones of said addressable entities that exhibit a higher frequency of recording and read back in successive outer radial ones of said bands and radially adjacent ones of said bands having a frequency change of not more than seven per cent.

65. In the disk apparatus set forth in claim 63 further including, in combination:

said addressable entities being addressable tracks, each said addressable track having a data-storage capacity of a plurality of data storage units; and said first predetermined ones of said addressable entities being addressable tracks from which other ones of said addressable tracks have circumferential positions determined.

66. In a machine-effected method of manufacturing a formatted disk to have a spiral track and a plurality of addressable entity indicia in the spiral track, each said indium for indicating an addressable entity; said formatted disk further to have a plurality of radially-extending bands of revolutions of said spiral track and an integral number of said indicated addressable entities in each of said bands of revolutions;

each said addressable entity to have an angular extent other than one, integral submultiple of or integral multiple of one of said revolutions such that circumferential locations of said indicia precess with respect to said revolutions;

including the machine-executed steps of:

establishing an index means in a master disk writer which represents one revolution of a turntable supporting a platter which is to be a formatted disk such that each said revolution begins and ends at a predetermined circumferential position on said formatted disk;

writing a formatted spiral track on the platter having a plurality of addressable-entity indicia representing one circumferential end of an addressable entity such that each revolution of said platter contains a non integral number of said indicated addressable entities; and every predetermined number of said revolutions recording on said platter at said index location a one of said addressable-entity indicia as a rotational positioning anchor indicium for ones of said addressable-entity indicia written that have no indicium located at said index position.

67. In the machine-effected method set forth in claim 66 further including the machine-executed steps of:

making each of said addressable entities as a set of a first plurality of sectors;

in each said band, for identifying each said sector, recording in each said addressable entity a said first plurality of sector-indicating indicia in equal angular spaced-apart predetermined circumferential positions within each respective addressable entities;

in each radially outer ones of said bands, reducing the size of said equal angular spaced-apart circumferential positions of said indicia such that the angular extent of each said addressable entity is reduced;

making all of said bands to have an identical radial extent and include an identical number of said revolutions; and recording machine-sensible signals in said indicia in said respective bands to have angular extents that decrease in successive radially outer bands and making the decrease a linear progression of substantially identical decreased angular extents.

68. In the machine-effected method set forth in claim 67 further including the machine-executed steps of:

dividing each of said bands into a predetermined number of revolution groups, making each of said revolution groups a second predetermined number of said revolutions and recording a third plurality of said sets of sector indicating indicia in each said revolution group in each of said bands, respectively, such that an integral number of said addressable entities in each said revolution group; and in successively radially outer ones of said bands, recording an identical number of revolution groups and in each said revolution group in said successively radially outer ones of the bands recording an increasing number of said sets of sector indicating indicia.

69. In the machine-effected method set forth in claim 68 further including the machine-executed steps of:

selecting said formatted disk to be a master disk;

actuating a laser to emit a laser beam for cutting a spiral groove having a given depth as said spiral track;

during cutting said spiral groove, modulating said laser beam to record said indicia as surface perturbations in the depth of said groove;

taking said master disk and forming disk stampers having a mirror image of said groove and perturbations; and in a molding machine, molding replicas of said master disk as data-storing formatted disks.

70. In the machine-effected method set forth in claim 66 further including the machine-executed steps of:

recording a single pseudo index mark as each respective one of said addressable entity indicating indicia.

71. In the machine-effected method set forth in claim 70 further including the machine-executed steps of:

in each said band, recording a plurality of revolution groups of said pseudo index marks; recording a like number of said pseudo index marks in each of said revolution groups; recording one of said pseudo index marks in each of said revolution groups at said reference position and circumferential positioning all other ones of said pseudo index marks at predetermined angular displacements along said spiral track, making each of said predetermined angular displacements a non-subintegral of one of said revolutions.

72. In the machine-effected method set forth in claim 71 further including the machine-executed step of:

recording on said formatted disk at predetermined ones of said pseudo index marks a home record HA.

73. In a machine-effected method of seeking from an addressable entity to another addressable entity on a data-storing disk, said data-storing disk having a spiral track with a plurality of revolutions beginning and ending at a single circumferential reference position, each of said addressable entities having an angular extent that is not an integral relation to the angular extent of one of said revolutions, a circumferential location of said addressable entities precessing with radius with respect to said reference position;

including the machine-executed steps of:

independently of a number of said addressable entities disposed between a current addressable entity from which a seek to a target addressable entity is to ensue, determining a number of said revolutions disposed between said current and target addressable entity;

modifying said number revolutions to a usable number of revolutions such that the seek will end on said spiral track such that scanning the spiral track leads to said target addressable entity;

moving a transducer from said current addressable entity toward said target addressable entity including crossing said usable number of revolutions including counting said usable number of revolutions crossed; and after crossing said usable number of revolutions, scanning along said spiral track for finding said target addressable entity.

74. In the machine-effected method set forth in claim 73 wherein a ratio of said number of said addressable entities with respect to number of revolutions varies with radius, further including the machine-executed steps of:

in said determining step, first determining a first number of a convolution in which said current addressable entity resides, second determining a second number of a convolution in which said target addressable entity resides, then subtracting said second number from said first number for generating said number of revolutions disposed between said current and target convolution.

75. In the machine-effected method set forth in claim 74 wherein said current and target addressable entities are sectors of an addressable track, further including the machine-executed steps of:

in said determining step, determining said first and second numbers using a predetermined sector of each said addressable tracks in which said current and target sectors reside irrespective of whether or not said predetermined sectors are said current and target sectors, respectively.

76. In a machine-effected method of operating a data-storing disk device having a data-storing disk with bands of revolutions and a transition between angularly adjacent bands consisting of first and second abutting data-storing sectors, one of the abutting sectors being in a radially inward one of the two bands and a second abutting sector being in a radially outward one of the two bands such that the frequency of operation for storing and reading data from the one abutting sector is less than the frequency of operation for storing or reading data from the second abutting sector, including the machine-executed steps of:

reading a last one of said sectors in a first one of said bands at a first frequency of operation;

upon completing the reading of said last one of said sectors, changing frequency of operation for reading by a predetermined frequency change; and then reading a first one of said sectors in a second one of said bands.

77. In the machine-effected method set forth in claim 76 further including the machine-executed steps of:

establishing a timer mode for changing frequency of operation in moving from one band to another band;

detecting and indicating that an end of said last one sector has a predetermined scan time from a current scanning position on said spiral track; and in said timer mode, after indicating said predetermined scan time, activating a time out timer and upon said time out timer timing out, changing frequency of operation to that of said first sector.

78. In the machine-effected method set forth in claim 76 further including the machine-executed steps of:

while scanning said last one sector, detecting and indicating that a predetermined length along said spiral track remains before scanning reaches said first sector; and responsive to said indication of a predetermined length, changing frequency of operation to that of said first sector.

79. In the machine-effected method set forth in claim 78 wherein an inter-band gap having a given circumferential length along said spiral track exists between said last one sector and said first sector, including the machine-executed step of:

detecting said predetermined length to be said given circumferential length.

80. In the machine-effected method set forth in claim 78 further including the machine-executed steps of:

performing a seek from current addressable entity to a target addressable entity; and said detecting and indicating step detecting and indicating a radial length as said predetermined length.

81. In apparatus for accessing addressable entities on a data-storing disk, said disk having a spiral track with a plurality of revolutions and extending between outer radial inner radial positions on the disk, positioning means in the apparatus for relatively radially moving a transducer and the disk including scanning said spiral track and seeking from a current one of said revolutions to a target one of said revolutions, signal means in operatively connected to said transducer for receiving and processing signals sensed by the transducer and for supplying signals to the transducer for recording on or erasing portions of said spiral track being scanned by said transducer, a microprocessor for controlling the apparatus and being connected to the seek means for actuating same and to said signal means for receiving and supplying signals from and thereto;

the improvement including, in combination:

said disk having a plurality of addressable entities respectively having angular extents that are not equal to, an integral sub-multiple or a multiple of one said revolution angular extent, entity-identifying machine-sensible indicia in each of said addressable entities;

said microprocessor having means for actuating said positioning means to cause said transducer to scan one of said addressable entities and for monitoring the scanning including receiving signals read from said addressable entity derived from said transducer sensing said entity-identifying indicia;

said microprocessor having entity-to-revolution conversion means responsive to said received signals derived from said entity-identifying indicia for indicating said current one of said revolutions;

said microprocessor having means indicating a target one of said addressable entities and being connected to said entity-to-revolution conversion means for supplying said indication of said target one of said addressable entities to said entity-to-revolution converter;

said entity-to-revolution converter means responding to said indication of said target addressable entity to generate and indicate said target revolution;

said microprocessor having seek generation means connected to said entity-to-revolution conversion means for generating a number indicating a number of said revolutions to be counted during a radial seek movement of said transducer from said current revolution to said target revolution; and said positioning means being connected to said seek generation means for responding to said indicated number of revolutions to radially move said transducer from said current revolution to said target revolution.

82. In the apparatus set forth in claim 81 further including, in combination:

said data-storing disk having a plurality of radial bands of said revolutions, a number of said addressable entities in each of said bands increasing with radius of said bands, said entity identifying indicia in each of said bands having a different angular extent such that sensing said indicia in different ones of said radial bands results in different frequency of signals;

said bands in radially adjacent ones of said radial bands having respective addressable entities at a boundary between said radially adjacent bands, said respective addressable entities having a different angular extent and being separate by an interband gap;

said microprocessor having a band boundary detection means connected to said signal means for receiving signals derived from said addressable entity indicia, band boundary indicating means having indications of said respective addressable entities at each of said band boundaries on said data-storing disk, said band boundary detection means being connected to said band boundary indicating means for comparing said band boundary indications with said received signals derived from said addressable entity indicia and being responsive to said received signals derived from said addressable entity indicia to actuate said signal means to begin operation at a next higher frequency for reading signals derived from said addressable entity indicia of a radially outer one of said bands of revolutions.

83. In the apparatus set forth in claim 82 further including, in combination:

said data-storing disk being an optical disk having a spiral groove for identifying said spiral track, said signal means including optical means for supplying a light beam to the optical disk for sensing said addressable entity indicia; and said signal means including readback means and writing means each having timed circuits and means for supplying timing signals to operate said timed circuits and means in the signal means coupled to said band boundary detecting means to respond to said indications of crossing a boundary from one of said radial bands to another of said radial bands for timing said timed circuits at a different frequency of operation.

84. In a data-storing disk apparatus for storing data in spaced-apart addressable data-storing entities, said disk apparatus having a plurality of substantially concentric radially-spaced-apart circular data-storing disk revolutions, said addressable data-storing entities being disposed in said data-storing disk revolutions, each of said data-storing revolutions beginning and ending at a constant circumferential reference position on said disk apparatus;

including, in combination:

each of said addressable entities having an angular extent that is other than an angular extend equal to an integral sub-multiple of or a integral multiple of an angular extent of any one of said data-storing revolutions;

predetermined ones of said addressable entities having an end aligned with said reference position, said first predetermined ones of said addressable entities being disposed in respective revolutions that are radially spaced apart a predetermined number of revolutions such that a linear array of said radially space-apart first predetermined ones of said addressable entities is disposed along said reference position;

all of said addressable entities other than said first predetermined ones of said addressable entities being disposed on said dish apparatus such that either said reference position is circumferentially remote from said other addressable entities or dissects said other addressable entities;

said addressable entities being grouped into a plurality of contiguous radial bands, each band including a plurality of said first predetermined ones of said addressable entities, each outer radial band having addressable entities that respectively subtend smaller angles in successively outer ones of said bands, said angles decreasing in size in a linear progression with radius of said bands.

85. In the disk apparatus set forth in claim 84, further including, in combination:
   each of said addressable entities being an addressable data-storing track;
   each of said addressable entities having a plurality of addressable subentities; and
   each of said subentities having machine-sensible address indicia for enabling addressing each of said subentities.

* * * * *